United States Patent [19]

Inamiya

[11] Patent Number: 5,363,110
[45] Date of Patent: Nov. 8, 1994

[54] POSITIONING SYSTEM UTILIZING ARTIFICIAL SATELLITES AND POSITIONING METHOD

[75] Inventor: Kenichi Inamiya, Kamakura, Japan

[73] Assignee: Mitsubishi Denki Kabushiki Kaisha, Tokyo, Japan

[21] Appl. No.: 51,625

[22] Filed: Apr. 22, 1993

[30] Foreign Application Priority Data

Apr. 23, 1992 [JP] Japan ................................. 4-130156
Dec. 28, 1992 [JP] Japan ................................. 4-355871

[51] Int. Cl.$^5$ .............................................. G01S 5/02
[52] U.S. Cl. .............................................. 342/357
[58] Field of Search .............................. 342/357, 352

[56] References Cited

U.S. PATENT DOCUMENTS 3,206,605 9/1965 Johns ............................. 342/357 X
3,497,807 2/1970 Newton et al. ................. 342/357 X
5,105,198 4/1992 Inamiya .
5,160,935 11/1992 Inamiya .

OTHER PUBLICATIONS

"Principle of Operation of Navstar & System Characteristics" by Milliken & Zoller, Sum. 87 Navigation Journal vol. 25, pp. 95–106.
"GPS Precise Positioning System by Artificial Satellites" Institute of Japan Geodesy pp. 129–131 & 140–145 Nov. 1986.
"Combined Satellite Navigation System . . . " Randolph Hartman, ICAO Journal, pp. 9–12, Mar. 1991.
"Special Committee on Future Air Navigation Systems", ICAO, Doc. 9524, FANS/4, May 1988.
"Report on the Tenth Air Navigation Conference", ICAO Doc. 9583 AN-CONF/10, Sep. 1991.
"Present Situation of Aeronautical Satellite Communication" by Saitoh, Kawai & Hatayama, KDD Technical Journal, pp. 5–9, Jul. 1991.
K. Inamiya, "Positioning Satellite System Using Intersatellite Communication" JSR, AIAA, vol. 28 Dec.-/Nov., 1991.
M. Kihara & T. Okuda "A Satellite Selection Method & Accuracy for the Global Positioning System" Navigation, ION vol. 31, Spring '84.
P. S. Jorgensen "Achieving GPS Integrity & Elimination Areas of Degraded Performance" Navigation, ION, vol. 34, Winter 87/88.

Primary Examiner—Mark Hellner
Attorney, Agent, or Firm—Wolf, Greenfield & Sacks

[57] ABSTRACT

A positioning system and method utilizing a plurality of artificial satellites, in which times of positioning time signals transmitted from at least four artificial satellites to a positioning available area are always made coincident with a standard time of a ground control station to maintain accuracy of the time. In the ground control station, phases of a receive PN code obtained from the time signal included in the positioning signal of the artificial satellite and a pseudo receive PN code obtained by delaying the standard time of the ground control station by a radio wave propagation time, measured in real time, corresponding to a range between the ground control station and the artificial satellite are compared, and from the detected time error, a time correction command signal is obtained and is transmitted to the artificial satellite to correct the time of the positioning time signal of the artificial satellite. As a result, the time of the positioning time signal can always be coincident with the standard time of the ground control station to maintain accuracy. As an original oscillator of the positioning time signals of the artificial satellites, a crystal oscillator can be used in place of an atomic clock.

17 Claims, 16 Drawing Sheets

POSITIONING SYSTEM UTILIZING ARTIFICIAL SATELLITES AND POSITIONING METHOD

BACKGROUND OF THE INVENTION

1. Field of the Invention

The present invention relates to a positioning system utilizing at least four artificial satellites which are placed in geosynchronous altitude orbits and are always visible from a ground control station (GCS) for calculating a position of an observation point by a positioning algorithm by using positioning signals transmitted from the artificial satellites, a positioning system utilizing the artificial satellites having a communication means, and a positioning method utilizing the artificial satellites.

2. Description of the Related Arts

As a conventional positioning system utilizing artificial satellites, for example, a GPS (Global Positioning System) is known. An outline of the GPS is disclosed in "Principle of Operation of NAVSTAR and System Characteristics", by R. J. Milliken and C. J. Zoller, Navigation, Journal of The Institute of Navigation, Vol. 25, No. 2, pp. 95–106, Summer 1987.

FIG. 1 illustrates an arrangement of artificial satellites used in the GPS. Numerals 1310, 1311, 1312 and 1313 designate the artificial satellites as NAVSTARs (Navigation System with Timing and Ranging), and their positions are indicated as A, B, C and D. Each NAVSTAR has a precise and stable atomic frequency standard (atomic clock) and can maintain a high accuracy of generated clock signal and calibrate the clock at a predetermined period by standard time information received from a GCS (Ground Control Station) to maintain the accurate time.

Also, concerning the positions of the NAVSTARs, the GCS carries out the determination and prediction of their orbits by the tracking data of the NAVSTARs and thus, when a time is selected, the positions of the NAVSTARs can be determined on the basis of the ephemerides. Hence, if an observer stays at the NAVSTAR, the position of the observer can be made known from the present time of the NAVSTAR and the orbital elements of its time. However now, a case where an observer remotely observes the NAVSTARs and carries out a determination of his own position will be considered.

In FIG. 1, a numeral 1314 indicates an observation point P of the observer. Now, it is assumed that there is a certain error $\Delta t$ between a time of a timing device the observer possesses and a standard time. It is also assumed that the observer carries out the observation at a time $Tno + \Delta t$, wherein $Tno$ is the standard time when the observer carries out the observation and $\Delta t$ is an inherent error of the timing device the observer has. Now, assuming that the four NAVSTARs A, B, C and D are observed by the observer at respective times $Tn1$, $Tn2$, $Tn3$ and $Tn4$, it is considered that signals representing the above-described times reach from the artificial satellites to the observer with delays corresponding to radio wave propagation times between the observer and the respective artificial satellites, and hence from the relationship between the observed times and the positions of the NAVSTARs, the following equations can be obtained:

$$AP = C(Tno + \Delta t - Tn1)$$

$$BP = C(Tno + \Delta t - Tn2)$$

$$CP = C(Tno + \Delta t - Tn3) \ldots \text{(i)}$$

$$DP = C(Tno + \Delta t - Tn4)$$

wherein AP, BP, CP and DP represent the range between the observation point P and the respective NAVSTARs and C represents the velocity of light.

In these four simultaneous equations (i), Cartesian coordinates x, y and z for defining the position of the observation point P (positioning point) and the error $\Delta t$ of the timing device are included as unknown value. Hence, these equations can have no solutions other than a singular point and the observation point can be decided. Also, the inherent error $\Delta t$ of the timing device the observer possesses can be known and thus the timing device can be calibrated.

The artificial satellites, NAVSTARs, for the GPS move in circular orbits at an altitude 20,183 Km. There are six orbital planes, and three artificial satellites are arranged at an equal interval in each orbit. Hence, when at least 18 artificial satellites are placed altogether in the six orbits, the positioning available areas can be formed all over the earth.

The circulation period of the NAVSTARs is 12 hours, and the same type of artificial satellites are present in the visible area seen from the GCS for controlling the artificial satellites for a limited time. However, the artificial satellites successively come by turn into the visible area and at least four artificial satellites can always exist in the visible area seen from the GCS.

Further, another conventional positioning system utilizing artificial satellites placed in quasi-geosynchronous altitude orbits having a large orbital inclination angle and a stationary altitude is disclosed in "Positioning Satellite System Using Intersatellite Communication", by K. Inamiya, Journal of Spacecraft and Rockets, AIAA. Vol. 28, No. 6, pp. 720–727, Dec.-Nov. 1991.

FIG. 2 shows this conventional positioning system utilizing artificial satellites. Numerals 1310, 1311, 1312 and 1313 denote artificial satellites A, B, C and D, respectively. Between a GCS 1320 and the artificial satellite A, a feeder link ($FL_{AG}$) 1321 is present, and a telemetry tracking command channel ($TC_{BG}$) 1322 is shown as one example between the GCS and the artificial satellite B. Numerals 1324, 1326 and 1328 designate respective communication channels ($RT_{AB}$, $RT_{BC}$ and $RT_{CD}$) between the adjacent artificial satellites A, B, C and D. The positioning signals ($RT_{AP}$, $RT_{BP}$, $RT_{CP}$ and $RT_{DP}$) 1321, 1325, 1327 and 1829 are transmitted From the respective artificial satellites A, B, C and D to a predetermined positioning available area.

When an artificial satellite is placed in a quasigeosynchronous altitude orbit having a large orbital inclination angle and a stationary altitude, a figure-eight characteristic is drawn on a ground surface. In this system, in the case of placing four artificial satellites in the orbits, the artificial satellites are arranged so that points intersecting with an equatorial plane of the figure-eight orbit may spread so as to be the space looked at from the observer. In order to form a positioning available area of this positioning system globally, 12 artificial satellites are placed in the orbits and are arranged at an interval of 30 degrees longitude in the equatorial plane, and the time relationship is determined so that mean anomalies among the adjacent artificial satellites may be separated from each other by a difference of 120 degrees.

In a range difference measuring system of the above-described conventional positioning system utilizing the artificial satellites, three hyperboloids are drawn as the differences between the four artificial satellites and the observation point, and are determined to be constant, and an intersecting point of the three hyperboloids is obtained. Signals of the range difference measuring system are generated through using an intersatellite communication. In FIG. 2, at the observation point P, the positioning signal output from the artificial satellite A is directly received and the same positioning signal transmitted from the artificial satellite A through the artificial satellite B also is received. At the observation point P, the two positioning signals received from the artificial satellite A through the two routes are compared with each other so measure a time difference AP-ABP and therefore its range difference AP-ABP.

Next, while the positioning signal is transmitted from the artificial satellite A to the GCS, simultaneously, the positioning signal is also transmitted from the artificial satellite A to the artificial satellite B, is turned back from the artificial satellite B to the artificial satellite A and is then transmitted to the GCS through the artificial satellite A. In the GCS, the two positioning signals transmitted from the artificial satellite A via the two routes are compared with each other to measure the range between the artificial satellites A and B, and this is transmitted to the artificial satellite B as telemetry data via the telemetry command channel $TC_{BG}$ (TT&C channel between the GCS and the artificial satellite B).

As described above, at the observation point P, AP-BP and AP can be known, and thus a range difference (AP~BP) can be calculated as follows:

$$(AP \sim BP) = AP - (ASP - AB)$$

In the same manner as described above, range differences (BP ~CP) and (CP~DP) can be calculated.

At the observation point P, by using these three range differences, the intersecting point of the three hyperboloids having the same range difference can be calculated and thus the position of the observation point P can be obtained.

In this range difference measuring system of the conventional positioning system utilizing the artificial satellites, though frequency (time) accuracy of an original oscillator is required, long term drift and the like of a crystal oscillator can be monitored in the GCS and can be included as the telemetry data into the positioning signals of the artificial satellites to inform to the observer and the observer then corrects the drift.

Further, still another conventional positioning system utilizing the artificial satellites has been proposed. In this case, so as to make an effective positioning at any place on the ground, the number of artificial satellites is increased from 18 to 21 for improving the fix accuracy of the positioning in the GPS (Global Positioning System). This is a countermeasure for the deterioration of the positional fix accuracy by a particular geometrical arrangement of a plurality of artificial satellites in the space varying with the elapse of time, seen from the observer, or for an occurrence of the impossible positional fix. The degree of degradation of the positional fix accuracy determined by the geometrical arrangement of the plurality of artificial satellites is called "GDOP (geometric dilution of precision)". The definition and introduction of the GDOP is disclosed in "GPS—Precise Positioning System by Artificial Satellites", edited by The Institute of Japan Geodesy, p. 131, pp. 140-145, November 1986, and "A Satellite Selection Method and Accuracy for the Global Positioning System" by M. Kihara and T. Okuda, Navigation. Journal of the Institute of Navigation, Vol. 31, No. 1, pp. 8-15, Spring 1984.

The background of the increased of number artificial satellites from 18 to 21 for the improvement of the GDOP is disclosed in "Achieving GPS Integrity and Eliminating Areas of Degraded Performance", by Paul A. Jorgensen, Navigation, Journal of the Institute of Navigation, Vol. 34, No. 4, pp. 297-306, Winter 1987-88, and "Combined Satellite Navigation Systems Could Lead to More Reliable and More Precise Air Navigation", by Randolph Hartman, ICAO Journal, pp. 9-12, March 1991.

In turn, the positioning system utilizing the artificial satellites has a role in navigation of a mobile body on the ground surface, and same time a mobile satellite communication for communicating the mobile body whose position is to be fixed and the GCS (or another communication party connected with-the GCS) in both directions via the artificial satellites also plays an important role. Now, paying attention to an aircraft as a mobile body in particular, a communication system between the aircraft and a ground station plays an important part in the same manner as the navigation system for reaching the desired destination on the basis of the aforementioned positioning.

For a line of sight communication between the aircraft and the ground station, a VHF band is most preferably used. For an over-the-horizen communication, even though existing weak points in propagation characteristics, an HI: band is used as a reliable communication, but this HF band communication has been replaced by an L band satellite communication. Satellite communication in the polar regions is a theme to be solved in Future.

The above-description is disclosed, for example, "Special Comittee on Future Air Navigation Systems", ICAO, Doc. 9524, FANS/4, MAY 1988, and "Report on the Tenth Air Navigation Conference ", ICAO, Doc. 9583, AN-CONF/10, September 1991.

In the case of the aircraft as the mobile body, the use of the satellites of the INMARSAT for mobile satellite communication is known. As regards the communication between the aircraft and the ground, air traffic control communication between a pilot and a controller on the ground, flight control communication between a cockpit and an airline, air service communication between aircraft passenger cabin crew and the airline, and public communication for passengers and the like are given. The mobile satellite communication channel is constructed between an aircraft GCS provided with a communication terminal device installed on the aircraft and the GCS as a base station via the INMARSAT satellites.

The above-described mobile satellite communication of the aircraft as the mobile body is disclosed in "Present Situation of Aeronautical Satellite Communication", by Saitoh, Kawai and Hatayama, KDD Technical Journal, No. 6, pp. 5-9, July 1991.

The conventional positioning systems utilizing the artificial satellites are constructed as described above and suffer from the following problems.

That is, in the conventional positioning system (GPS) utilizing the artificial satellites, the artificial satellites are placed in the orbits with an orbital period of 12 hours and the visible time from the GCS for controlling the artificial satellites is limited. Hence, for keeping the correct time of the positioning signals of the artificial satellites, a standard time generator having a small variation and less frequent correction times is required, and it is necessary to use the complicated and heavy atomic frequency standard (atomic clock) for installing on the artificial satellites. Also, when the artificial satellites are out of sight of the GCS, the condition of the positioning signals of the artificial satellites cannot be monitored in the GCS, and thus the monitoring result of the signal condition cannot be supplied to the observer within the positioning available area in real time.

In the conventional positioning system utilizing the artificial satellites, the artificial satellites are placed in the quasi-geosynchronous altitude orbits having the large orbital inclination angle and the stationary altitude and it is necessary to determine the placing condition for forming the positioning available area of the positioning system in a predetermined region.

Also, in the conventional positioning system utilizing the artificial satellites, the degradation of the positional fix accuracy is sometimes caused by some specific geometrical arrangement of the plurality of artificial satellites, varying with the passage of time, as seen from the observer.

Further, the conventional positioning system utilizing the artificial satellites plays a role in the navigation of the mobile body on the ground surface and same time the mobile body satellite communication for communicating the mobile body whose position is to be fixed and the GCS (or another communication party connected with the GCS) in both the directions via the artificial satellites also plays an important role. However, the conventional mobile satellite communication system is a different system from the positioning system, and when two roles are needed, it is required to use the combination of mobile satellite communication system and positioning system. Further, this is a problem in effective use of the common parts of the systems.

SUMMARY OF THE INVENTION

Accordingly, it is a first object of the present invention to provide a positioning system utilizing artificial satellites in view of the aforementioned problems of the prior art, which is capable of always maintaining precision even when a crystal oscillator is used as an original oscillator for a time signal to be included in positioning signals to be transmitted from at least four artificial satellites to a positioning available area, always monitoring a status of the positioning signals, and supplying the monitored result to an observer within the positioning available area in real time.

It is a second object of the present invention to provide a positioning system utilizing artificial satellites, which is capable of simplifying a construction of an antenna device of a ground control station for controlling at least four artificial satellites.

It is a third object of the present invention to provide a positioning system utilizing artificial satellites, which is capable of forming a positioning available area where at least four artificial satellites are always visible to an observer, in a predetermined region.

It is a fourth object of the present invention to provide a positioning system utilizing artificial satellites, which is capable of forming a positioning available area where at least four artificial satellites are always visible to an observer, in a predetermined region, and reducing degradation of positional fix accuracy due to a geometrical arrangement of the artificial satellites varying with the passage of time, as seen from the observer.

It is a fifth object of the present invention to provide a positioning system utilizing artificial satellites, which is capable of always maintaining precision even when a crystal oscillator is used as an original oscillator for a time signal to be included in positioning signals to be transmitted from at least four artificial satellites to a positioning available area, always monitoring a status of the positioning signals, and supplying the monitored result to an observer within the positioning available area in real time, and which is capable of simplifying a system construction provided with a communication channel between a first artificial satellite having a feeder link connected with a ground control station and a second artificial satellite adjacent to the first artificial satellite so as to realize the fifth object.

It is a sixth object of the present invention to provide a positioning system utilizing artificial satellites, which is capable of communicating between a mobile body, to be positioned, having a communication terminal device and a ground control station (or a communication party connected with the ground control station) via the artificial satellites in both directions.

It is a seventh object of the present invention to provide a positioning method utilizing artificial satellites, which is capable of forming a positioning available area where at least four artificial satellites are always visible to an observer, in a predetermined region, and reducing degradation of positional fix accuracy due to a geometrical arrangement of the artificial satellites varying with the passage of time, as seen from the observer.

In order to achieve the aforementioned objects of the present invention, there is provided a positioning system utilizing a plurality of artificial satellites, at least four artificial satellites always being visible from a ground control station and being placed in quasigeosynchronous altitude orbits so as to transmit positioning signals to a positioning available area for calculating a position of an observer within the positioning available area from a positioning algorithm of the observer, comprising:

(a) artificial satellites including:
 (a1) means for returning the positioning signal transmitted from the ground control station;
 (a2) means for generating a time signal (herein after referred to as a positioning time signal) which is originated from an original oscillator and is included in the positioning signal;
 (a3) means for correcting a time of the positioning time signal on the basis of a time correction command signal transmitted from the ground control station;
 (a4) means for including a monitored result of a status of the positioning signal transmitted from the ground control station into telemetry data of the positioning signal;
 (a5) means for generating the positioning signal by multiplexing the positioning time signal and the telemetry data; and
 (a6) means for transmitting the positioning signal to a predetermined positioning available area; and
(b) a ground control station for controlling the artificial satellites, including:
 (b1) means for measuring a range between tile ground control station and each artificial satellite in real time on the basis of the positioning signal to be transmitted from the ground control station to each artificial satellite and each positioning signal (hereinafter referred to as a turnback positioning signal) returned back from each artificial satellite;

(b2) means for detecting an error by comparing between time obtained by delaying a standard time of a standard time device of the ground control station by a radio wave propagation time corresponding to a range between the ground control station and each artificial satellite due to (b1) and time of the positioning time signal transmitted from each artificial satellite;

(b3) means for generating the time correction command signal from the error detected and to transmit the time correction command signal to each artificial satellite; and (b4) means for always monitoring the status of the positioning signal and to transmit a monitored result to each artificial satellite, the time included in the positioning signal of the artificial satellite being corrected so as to always coincide with the standard time of the ground control station, the status of the positioning signal being always monitored to include the monitored result into the positioning signal of the artificial satellite and to provide the monitored result to the observer within the positioning available area in real time.

Further, the positioning system of the present invention further comprising means for receiving signals transmitted from at least four artificial satellites always visible from the ground control station and independently receiving the signals transmitted from the artificial satellites at the same time by a beam forming network, and means for selecting one of signals to be transmitted to the artificial satellites, controlling a phase of the selected signal so as to directly transmit a beam to a destination direction of the selected signal and transmitting the selected signal to a predetermined artificial satellite.

Also, according to the present invention, at least artificial satellites for positioning are placed in quasigeosynchronous altitude orbits having a stationary altitude and an orbital inclination angle of at least 5 degrees to at most 18 degrees with respect to an equatorial plane for every artificial satellite so that mean anomalies of the adjacent artificial satellites are a difference of 120 degrees and approximately an equal interval at longitude on the equatorial plane within a visible area as seen from a ground control station, and a positioning available area always including at least four artificial satellites is formed within the visible area as seen from an observer of a predetermined region.

Further, in the present invention, at least four artificial satellites for positioning are placed in quasigeosynchronous altitude orbits having a stationary altitude and an orbital inclination angle of 20 degrees±20 degrees with respect to an equatorial plane for every artificial satellite so that mean anomalies of the adjacent artificial satellites are a difference of 120 degrees in standard anti ascending node positions set at an equal interval on the equatorial plane within a visible area as seen from a ground control station are determined to be standard and that bias values are given to at least either the difference value of the mean anomalies or the ascending node positions, and a positioning available area always including at least four artificial satellites is formed within the visible area as seen from an observer of a predetermined region, thereby reducing degradation of positional fix accuracy determined by a geometrical arrangement of the artificial satellites, as seen from the observer.

According to the present invention, there is also provided a positioning system utilizing a plurality of artificial satellites, at least four artificial satellites always being visible as seen from a ground control station and being placed in quasi-geosynchronous altitude orbits so as to transmit positioning signals to a predetermined positioning available area for calculating a position of an observer within the positioning available area from a positioning algorithm of the observer, comprising:

(c) artificial satellites including:

(c1) intersatellite communication channels between the artificial satellites;

(c2) means for transmitting the positioning signal to be transmitted from the ground control station to an artificial satellite having the ground control station and a feeder link (hereinafter referred to as a specific artificial satellite) to the artificial satellites via the communication channels of (c1) and transmitting back positioning signals as the positioning signals returned back by the artificial satellites to the ground control station via the same path;

(c3) means for generating a time signal (hereinafter referred to as a positioning time signal) which is originated from an original oscillator and is included in the positioning signal;

(c4) means for transmitting the positioning signal from the specific artificial satellite to the ground control station and simultaneously transmitting the positioning signals from other artificial satellites to the ground control station via the communication channels of (c1) and the specific artificial satellite;

(c5) means for correcting a time of the positioning time signal on the basis of a time correction command signal transmitted from the ground control station;

(c6) means for including a monitored result off a status of the positioning signal transmitted from the ground control station into telemetry data of the positioning signal;

(c7) means for generating the positioning signal by multiplexing the positioning time signal and the telemetry data; and (c8) means for transmitting the positioning signal to a predetermined positioning available area; and (d) a ground control station for controlling the artificial satellites, including:

(d1) means for measuring a range along each measuring path between the ground control station and each artificial satellite in real time on the basis of the positioning signal to be transmitted from the ground control station to the specific artificial satellite and further to be transmitted from the specific artificial satellite to each artificial satellite, and each positioning signal which is the positioning signal returned back from each of the artificial satellites including the specific artificial satellite;

(d2) means for detecting an error by comparing between a time obtained by delaying a standard time of a standard time device of the ground control station by a radio wave propagation time corresponding to a range between the ground control station and each artificial satellite due to (d1) and a time of the positioning time signal transmitted from each artificial satellite;

(d3) means for generating the time correction command signal from the error detected to transmit the time correction command signal to each artificial satellite; and (d4) means for always monitoring the status of the positioning signal to transmit a monitored result to each artificial satellite, the time included in the positioning signal of the artificial satellite being corrected so as to always coincide with the standard time of the ground control station, the status of the positioning signal being always monitored to include the monitored result into the positioning signal of the artificial satellite and to provide the monitored result to the observer within the positioning available area in real time.

Also, the positioning system further comprising means for carrying out communication between the specific artificial satellite having the ground control station and a feeder link and a mobile body having a communication terminal device for carrying out a positioning, means carrying out a communication between the ground control station for controlling the positioning artificial satellites and the specific artificial satellite, and an interface device for connecting with an external connection channel.

In the present invention, the time included in the positioning signal of each artificial satellite and the time obtained by delaying the standard time of the standard time device of the ground control station by the radio wave propagation time corresponding to the range between the ground control station and each artificial satellite are always compared, and the time correction command signal obtained from the detected time error is transmitted to the artificial satellite to correct the time of the positioning signal of the artificial satellite, thereby making the time of the positioning time signal included in the positioning signal of the artificial satellite always coincident with the standard time of the ground control station to maintain the accuracy of the time.

Also, the status of the positioning signal of each artificial satellite is always monitored to transmit the monitored result to each artificial satellite and to include the monitored result into the telemetry data of the positioning signal, and thus the monitored result of the status of the positioning signal can be supplied to the observer within the positioning available area in real time.

Further, the receive signals are received from at least four artificial satellites always visible from the ground control station, and the signals are independently received from the artificial satellites at the same time by a beam forming network. On the other hand, one of the transmit signals to be transmitted to the artificial satellites is selected, and the phase of the selected signal is controlled so as to directly transmit a beam to the destination direction of the selected signal to provide a multibeam antenna for transmitting the selected signal to the predetermined artificial satellite. Hence, the antenna device of the ground control station can be constructed as a single antenna device.

Also, at least four artificial satellites for positioning are placed in quasi-geosynchronous altitude orbits having a stationary altitude and an orbital inclination angle of at least 5 degrees to at most 18 degrees with respect to an equatorial plane for every artificial satellite so that mean anomalies of the adjacent artificial satellites are a difference of 120 degrees and approximately an equal longitudinal interval on the equatorial plane within a visible area as seen from a ground control station, and hence a positioning available area always including at least four artificial satellites can be formed within the visible area as seen from an observer of a predetermined region.

Further, at least four artificial satellites for positioning are placed in quasi-geosynchronous altitude orbits having a stationary altitude and an orbital inclination angle of 20 degrees±20 degrees with respect to an equatorial plane for every artificial satellite so that mean anomalies of the adjacent artificial satellites are a difference of 120 degrees in standard and ascending node positions set at an equal interval on the equatorial plane within a visible area as seen from a ground control station are determined to be standard, and a positioning available area always including at least four artificial satellites can be formed within the visible area as seen from an observer of a predetermined region.

In this case, bias values are given to either the difference value of the mean anomalies or the ascending node positions or both of the members, and degradation of positional fix accuracy determined by a geometrical arrangement of the artificial satellites, as seen from the observer can be reduced.

Further, the time included in the positioning signal of each artificial satellite and the time obtained by delaying the standard time of the standard time device of the ground control station by the radio wave propagation time corresponding to the range along the measuring path between the ground control station and each artificial satellite are always compared, and the time correction command signal obtained from the detected time error is transmitted to the artificial satellite to correct the time of the positioning signal of the artificial satellite, thereby making the time of the positioning time signal included in the positioning signal of the artificial satellite always coincident with the standard time of the ground control station to maintain the accuracy of the time.

Also, the status of the positioning signal of each artificial satellite is always monitored to transmit the monitored result to each artificial satellite and to include the monitored result into the telemetry data of the positioning signal, and thus the monitored result of the status of the positioning signal can be supplied to the observer within the positioning available area in real time.

Further, the above-described operation is carried out by using the communication channels between the specific artificial satellite and the ground control station and the feeder link and the artificial satellites adjacent thereto, thereby simplifying the construction of the positioning system.

Also, of the artificial satellites of the positioning system, the specific artificial satellite having the ground control station and the feeder link is provided with a mobile satellite communication repeater, and the ground control station is provided with a transmitter-receiver for a mobile satellite communication and the interface device for connecting to the external channel. Hence, a mobile body having the communication terminal device and the ground control station (or a communication party connected to the ground control station) can communicate with each other in both directions.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
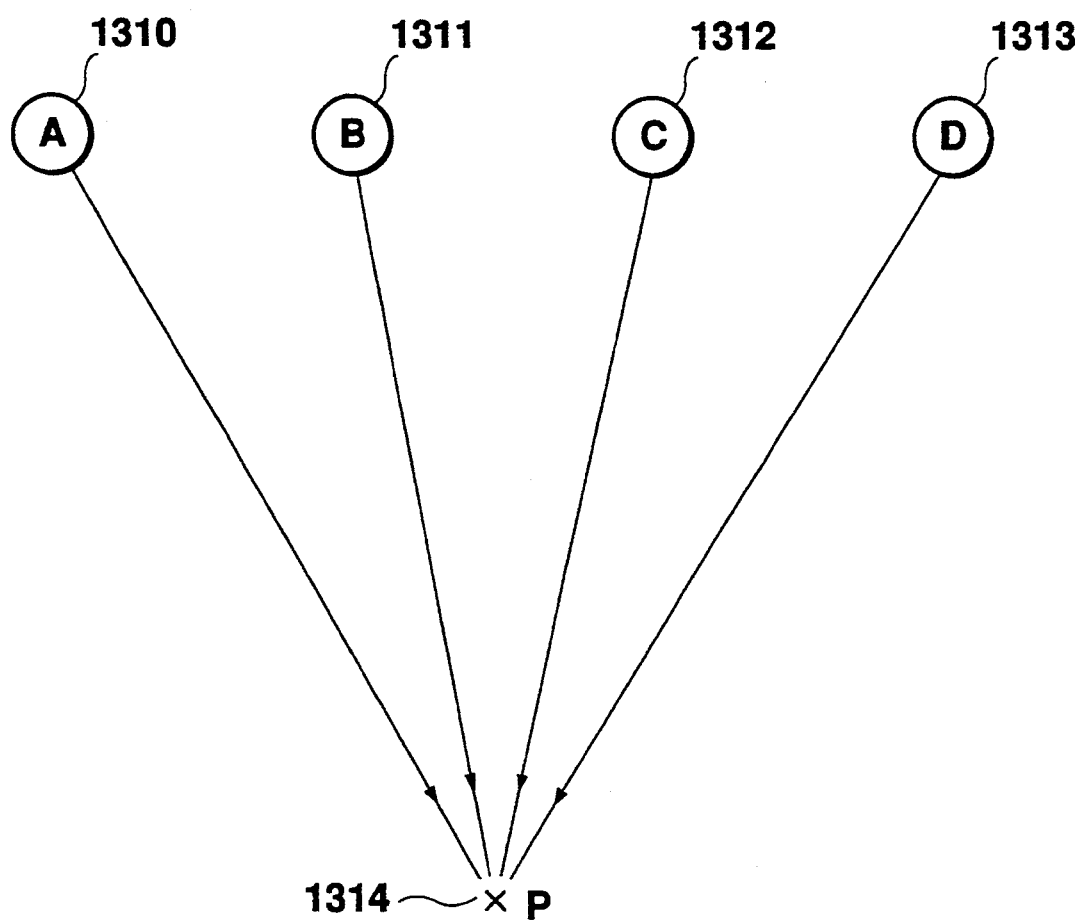
FIG. 1 is a schematic view showing a conventional positioning system (GPS) utilizing artificial satellites.
Figure 2:
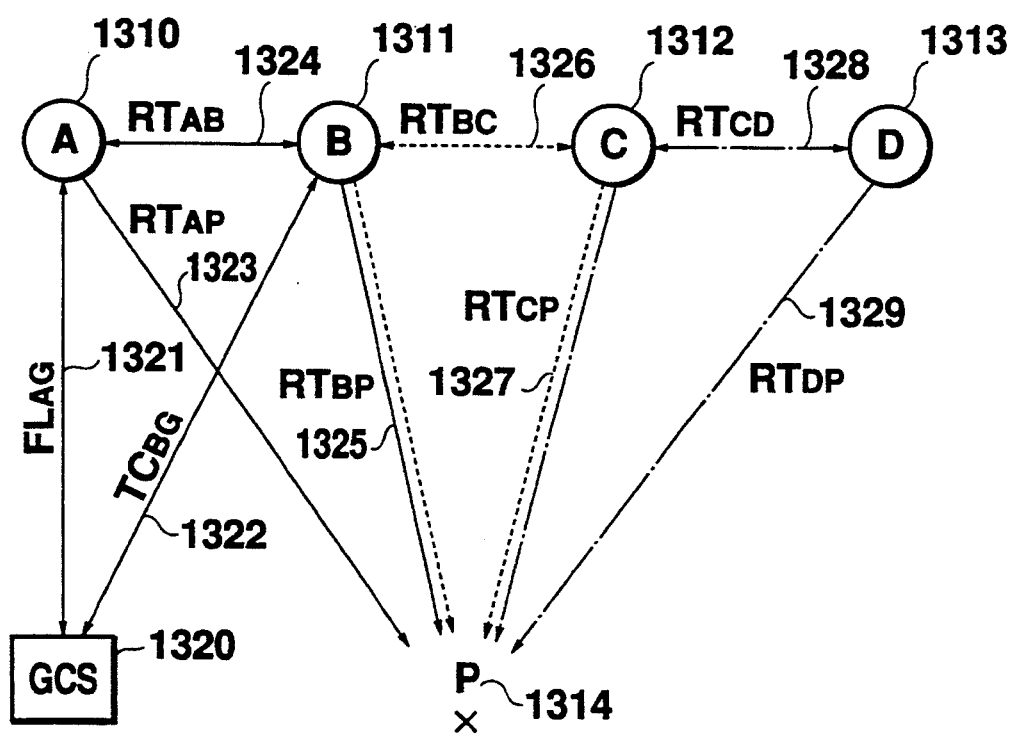
FIG. 2 is a schematic view showing another conventional positioning system utilizing artificial satellites.

The present invention will now be described with reference to its preferred embodiments in connection with the attached drawings, wherein like reference characters designate like or corresponding parts throughout the views and thus the repeated description thereof can be deleted for conciseness.

Figure 3:
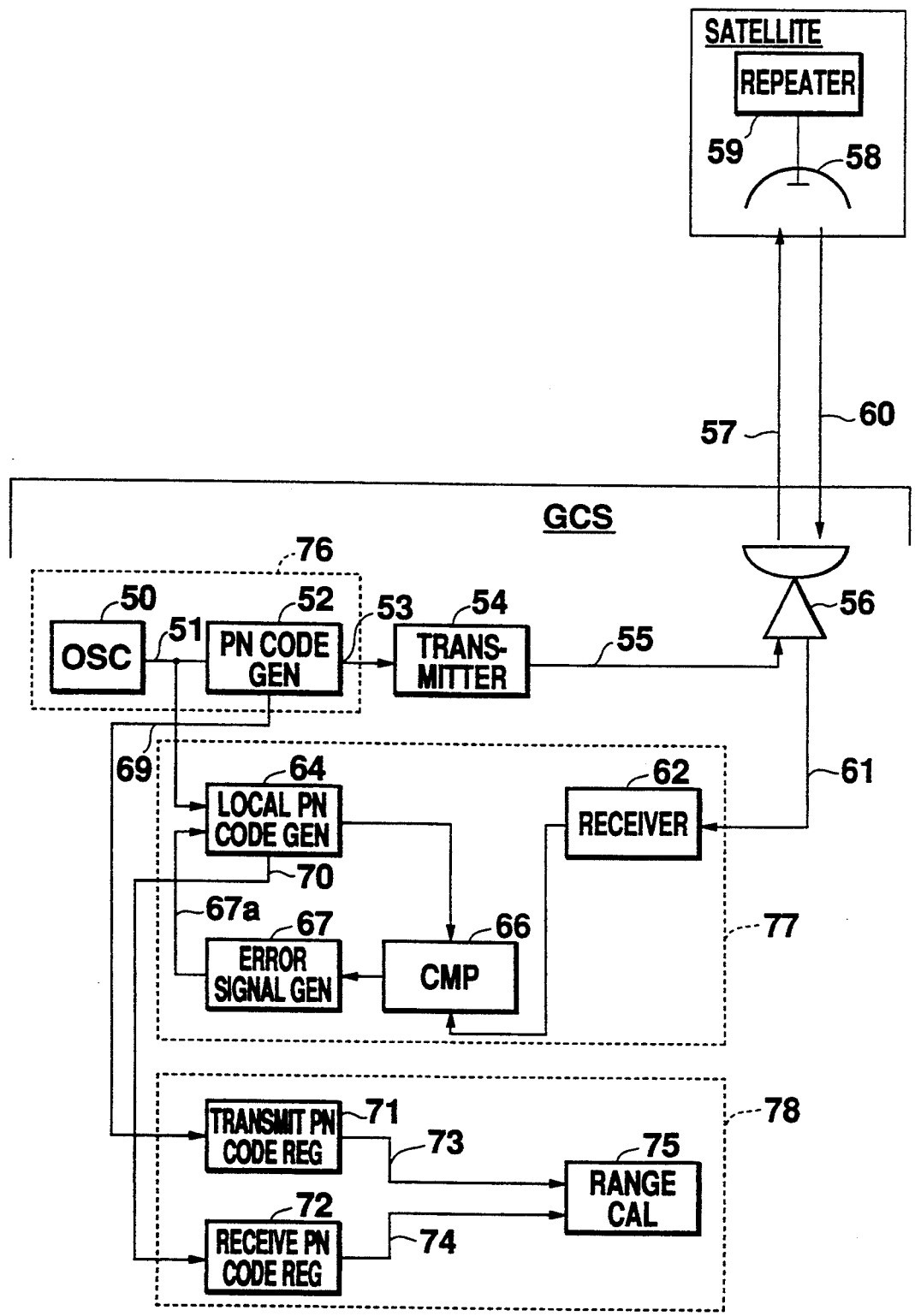
FIG. 3 is a block diagram of a range measuring system of a GCS in a first embodiment of a positioning system utilizing artificial satellites according to the present invention.
Figure 8:
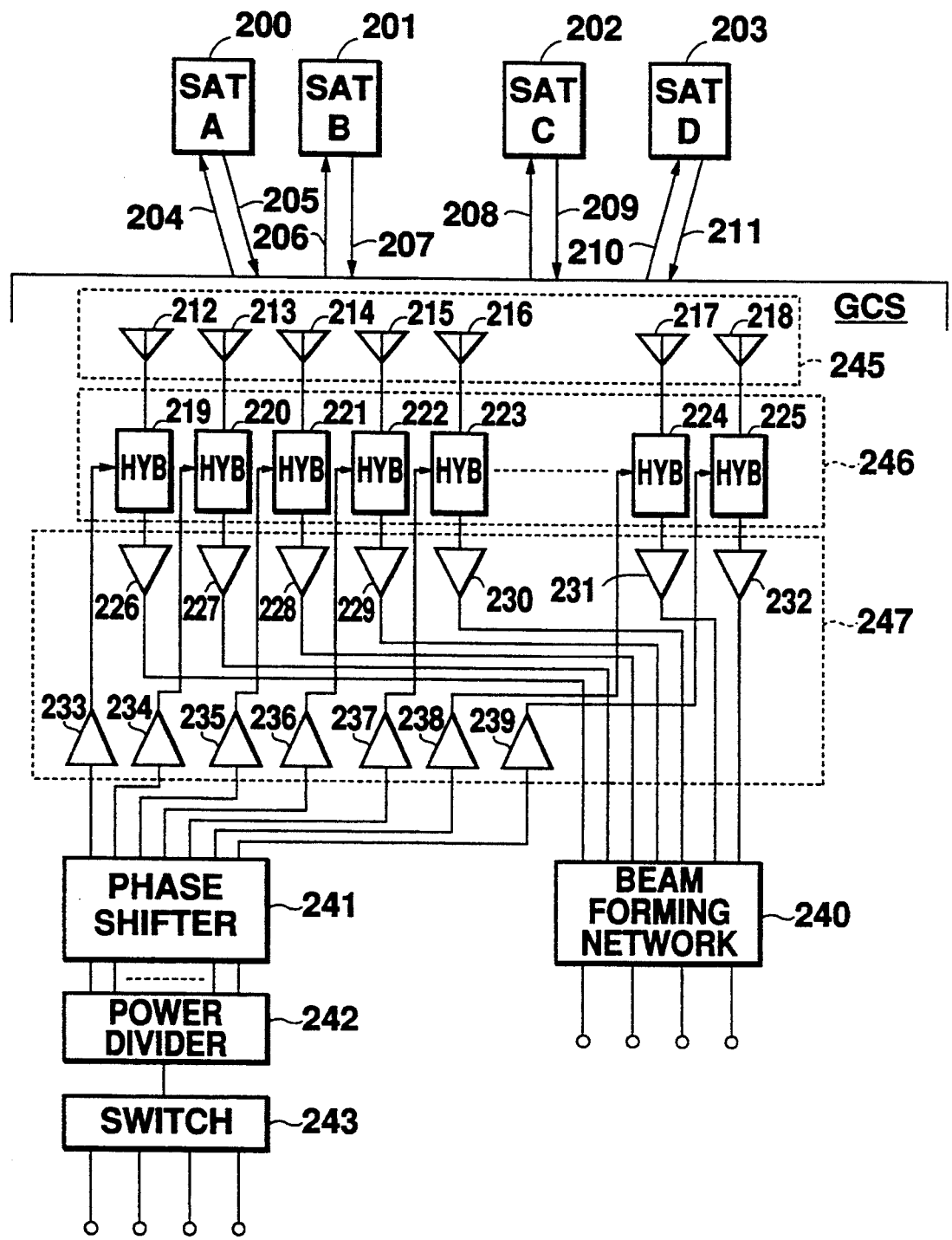
FIG. 8 is a block diagram of an antenna device off a GCS of a second embodiment of a positioning system utilizing artificial satellites according to the present invention.

The first embodiment:

FIG. 3 shows a range measuring system of a GCS (ground control station) and an artificial satellite in the first embodiment of a positioning system utilizing the artificial satellites according to the present invention. In FIG. 8, only one artificial satellite is shown. A real time measuring of a range between the GCS and the artificial satellite will now be described in connection with FIG. 8. Now, constants, and signals to be used in the following embodiments will be described as follows, but any others except the above-described will be described by algebraic values.

The velocity of light: $C = 2.99792458 \times 10^8$ m/sec

Bit length of a PN code to be used for the measuring:

$2^{20} - 1 = 1,048,575$

The first PN code is started at an integral second time, and the PN code of $2^{20} - 1$ is finished at the next integral second time. It is assumed that a chip number (chip clock frequency of the PN code) in one second at this time is fm.

$fm = 1.048575$ MHz (Mbps)

A frequency (fc1 or fc2) of either $2^9$ or $2^8$ times as much as fm will be used as a frequency of an original oscillator for driving the PN code.

$fc1 = 536.8704$ MHz $= fm \times 512$ $fc2 = 268.4352$ MHz $= fm \times 256$

An equivalent length per one chip of the PN code becomes as follows:

$(2.99792458 \times 10^8)/(1.048575 \times 10^6) = 258.90463$ m

Also, an equivalent length per one cycle of fc1 is 0.558 m and an equivalent length per one cycle of fc2 is 1.1168 m.

In FIG. 3, a range measuring signal generator 76 includes an original oscillator 50 and a PN code generator 52. The PN code generator 52 outputs a range measuring signal 53 to a transmitter 54, and the transmitter 54 transmits out a signal to a GCS antenna 56. The GCS antenna 56 is connected with an antenna 58 installed on the artificial satellite via an up link 57 and a down link 60. The antenna 58 is coupled with a repeater 59 installed on the artificial satellite. The GCS antenna 56 outputs a received signal 61 to a receiver part 77 including a receiver 62, a local PN code generator 64, a comparator (CMP) circuit 66 and an error signal generator 67. A range calculator part 78 includes a transmit PN code register 71, a receive PN code register 72 and a range calculator 75.

Now, it is assumed that fc1 is used as an oscillation frequency of the original oscillator 50. This frequency fc1 is determined to be $2^9$ times higher than the chip number (chip clock frequency) fm of one cycle of a transmit PN code (range measuring signal) 53 output from the PN code generator 52, and, when the phase of a receive PN code is measured, one cycle of fc1 is considered as the minimum unit of the measuring. The original oscillator 50 outputs a rectangular wave signal 51. In the PN code generator 52, the signal is frequency-divided into 1/9 and the divided signal is input to a 20 stage or a couple of 10 stage shift registers to obtain the range measuring signal 53 driven by the chip clock frequency of fm. The range measuring signal 53 is transmitted to the artificial satellite via the transmitter 54 and the GCS antenna 56.

In the artificial satellite, the repeater 59 turns back the range measuring signal 53 received by the antenna 58 to the GCS by a system carrying out a PCM regeneration or an amplification. Although a propagation delay of the signal is caused, its amount is a known amount which is previously measured as a receive signal level or a temperature function on the ground, and the propagation delay can be corrected as a fixed value of the artificial satellite at the orbit operation time.

As to the up link 57 and the down link 60 between the GCS and the artificial satellite, the TT&C channel can be also used. However, when the feeder link is present, the feeder link has high transmission quality and thus the feeder link is preferably used.

In the GCS, the range measuring signal 61 received by the GCS antenna 56 is transmitted to the comparator circuit 66 via the receiver 62 and the local PN code generated by the local PN code generator 84 is also fed to the comparator circuit 66 which compares the two signals. In the comparator circuit 66, a correlation between the two signals is detected for a predetermined time, and, when the phase difference between the codes of the two signals is within one cycle, a significant correlation output is obtained, but, when the phase difference is beyond one cycle, only a correlation output considered as a random error is obtained. When the significant correlation output is not obtained in the comparator circuit 66, the error signal generator 67 generates an error output 67a. Then, the clock generated the local PN code generator 64 is added or deleted at one cycle unit of fc1 of the original oscillator 50, and this operation is repeated until the phase of the output signal of the local PN code generator 64 is coincident with the phase of the returned range measuring signal 61. The local PN code generator 64 can be provided with a plurality of shift registers in order to quicken the phase detection of the received signal 61. When the output of the comparator circuit 66 becomes the maximum, the phase of the output signal of the local PN code generator 64 becomes coincident with the phase of the returned range measuring signal 61.

The contents of the shift registers of the PN code generator 52 of the range measuring signal generator 76 and the local PN code generator 64 of the receiver part 77 are read out at a predetermined timing, and the read-out contents are supplied to the transmit PN code register 71 and the receive PN code register 72 of the range calculator part 78. The outputs 73 and 74 of the transmit PN code register 71 and the receive PN code register 72 are fed to the range calculator 75, and the range calculator 75 can immediately read the range between the GCS and the artificial satellite from the phase difference between the contents in the transmit PN code register 71 and the receive PN code register 72. At this time, the propagation delay time within the system of the artificial satellite can also be corrected.

As described above, the range between the GCS and the artificial satellite is varied during operation of the artificial satellite. However, by shortening the sampling period of the output (range measuring signal) of the PN code generator 52, the range calculator 75 can precisely carry out the range calculation.

Figure 4:
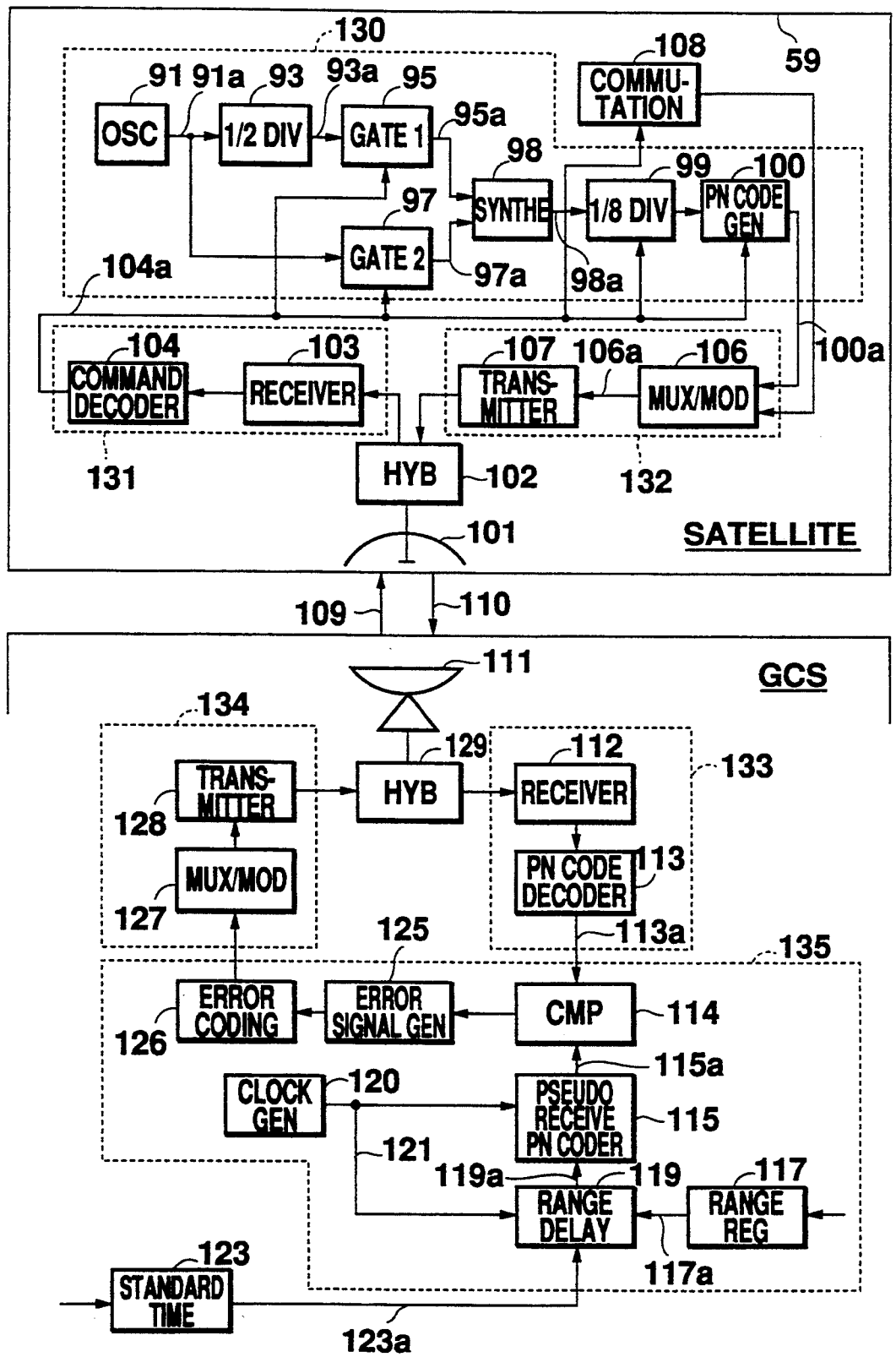
FIG. 4 is a block diagram of a positioning time system of a GCS and an artificial satellite in the first embodiment of the positioning system utilizing artificial satellites according to the present invention.
Figure 5:
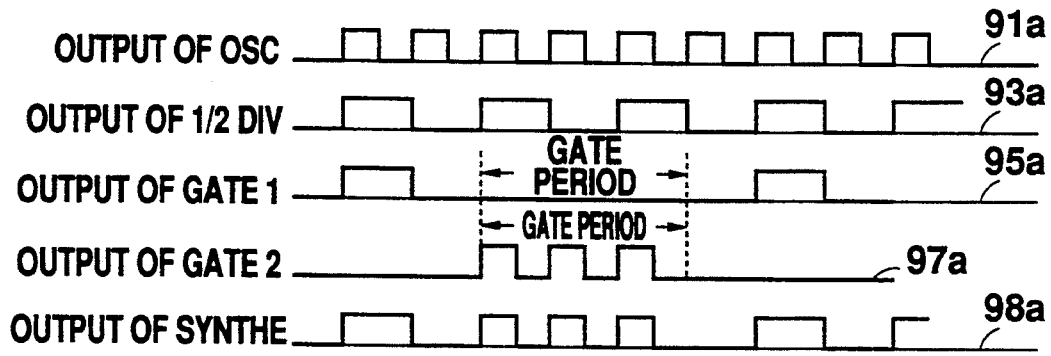
FIG. 5 is a timing chart for a time correction operation of positioning time signals in the artificial satellite shown in FIG. 4.
Figure 6:
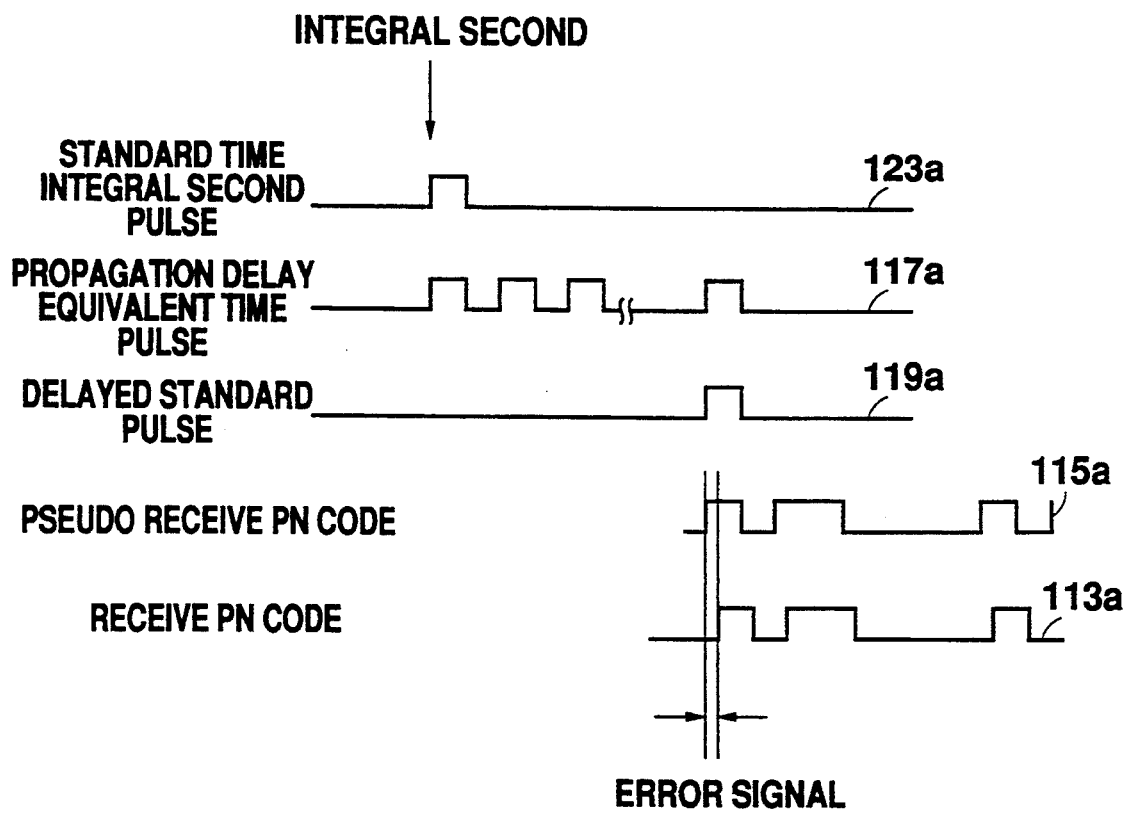
FIG. 6 is a timing chart of a time error detection of the positioning time signals in the GCS shown in FIG. 4.

FIG. 4 illustrates a positioning time system of the GCS and the artificial satellite in the positioning system utilizing the artificial satellites. In FIG. 4, only one artificial satellite is shown. FIG. 5 is a timing chart of a time correction of positioning time signals in the artificial satellite shown in FIG. 4, and FIG. 6 is a timing chart of a time error detection of the positioning time signals in the GCS shown in FIG. 4.

In FIG. 4, first, the structure of the positioning time system of the artificial satellite will now be described. That is, a positioning time signal generation & correction part 130 generates the positioning time signal of the artificial satellite and corrects the time by a time correction command signal transmitted from the GCS. The positioning time signal generation & correction part 130 includes an original oscillator 91, a ½ divider circuit 93, a first gate circuit 95, a second gate circuit 97, a synthesizer circuit 98, a 1/8 divider circuit 99 and a PN code generator 100. In a receiver part 131, a receiver 103 receives a command signal for a time correction from the GCS via an antenna 101 for the artificial satellite and a hybrid (HYB) circuit 102 connected thereto, and a command decoder circuit 104 generates a time correction signal 104a. In a transmitter part 132, a MUX/MOD (multiplexer/modulator) circuit 106 receives a positioning time signal 100a output from the PN code generator 100 and an output signal 108a of a commutation circuit 108 and generates a positioning signal 106a, and a transmitter 107 transmits the positioning signal 106ato the GCS via the hybrid circuit 102 and antenna 101.

Next, the structure of the positioning time system of the GCS will now be described. A GCS antenna 111 is coupled with the antenna 101 of the artificial satellite via an up link 109 and a down link 110. The GCS antenna 111 is connected to a hybrid circuit 129. A standard time device 123 outputs an integral second pulse 123a of a standard time. In a receiver part 133, a receiver 112 receives the positioning signal from the artificial satellite via the GCS antenna 111 and the hybrid circuit 129, and a PN code decoder circuit 113 regenerates the positioning signal output a received PN code 118a. A transmitter part 134 transmits the command signal for the time correction of the positioning time signal to the artificial satellite via the hybrid circuit 129 and the GCS antenna 111. The transmitter part 134 includes a MUX/MOD circuit 127 and a transmitter 128. A positioning time error detection part 135 detects a time error of the positioning time signal of the artificial satellite on the basis of range information between the GCS and the artificial satellite and the standard time output from the standard time device 123 and generates the command signal for the time correction. The positioning time error detection part 135 includes a comparator (CMP) circuit 114, a pseudo receive PN coder circuit 115, a range register circuit 117, a range delay circuit 119, a clock generator 120, an error generator circuit 125 and an error coding circuit 126.

Next, the time correction operation of the positioning time signal in the artificial satellite shown in FIG. 4 will now be described in connection with FIGS. 4 and 5.

In this embodiment, the source of the positioning time signal of the artificial satellite is the original oscillator 91 which generates a signal 91a having a frequency off fc1. One cycle of fc1 is the minimum unit of the time correction. Usually, in the case of no time correction, an output signal 93a of the ½ divider circuit 93 is input to the 1/8 divider circuit 99 via the synthesizer circuit 98 without being blocked by the first gate circuit 95. Now, when the receiver part 131 receives the command off the time correction from the GCS and the first gate circuit 95 is gated by the time correction signal 104a output from the command decoder circuit 104 to stop the signal input for a certain time period, the first gate circuit 95 does not pass the input signal in the gate period and thus signal pulses in the gate section are rejected in a first gate circuit output signal 95a, as shown in FIG. 5.

The second gate circuit 97 is normally closed, but, when the second gate circuit 97 is opened by the time correction signal 104a for a certain time period, the second gate circuit 97 allows the input signal 91a to pass for the gate period. For example, as shown in FIG. 5, the signal pulses in the gate section are passed in a second gate circuit output signal 97a. In this case, the synthesizer circuit 98 outputs a synthesized signal 98a obtained by synthesizing the two output signals 95a and 97a of the and second gate circuits 95 and 97, as shown in FIG. 5. When the synthesized signal 98a is input to the 1/8 divider circuit 99, in the output of the 1/8 divider circuit 99, the phase of the signal is advanced by one cycle of fc1, and on the other hand, when only the first gate circuit output signal 95a is input, the phase is delayed by two cycles of fc2 in the output.

As described above, in the artificial satellite, depending on the command signal for the time correction transmitted from the GCS, the time correction signal 104a output from the command decoder circuit 104 can control the number of the pulses input to the 1/8 divider circuit 99 to equivalently control the phase of the positioning time signal output from the PN code generator 100. In this case, it is assumed that when the contents of all the shift registers constituting the PN code generator 100 are cleared, the time is the integral second. At this timing, the commutation circuit 108 clearly indicates this time as a telemetry data value. Next, in the MUX/MOD circuit 106, the positioning time signal and the telemetry data are both modulated to generate the positioning signal 106a.

In this case, the time initially considered as the integral second on the artificial satellite can not necessarily agree with the standard time of the standard time device 123 in the GCS, and hence, when the integral second on the artificial satellite is compared with that of the standard time of the standard time device 123 to detect an error, the first and second gate circuits 95 and 97 are operated by the command signal for the time correction transmitted from the GCS so as to precisely coincide the former with the latter. As a result, the precise time of the positioning time signal can be obtained on the artificial satellite.

Next, the time error detection operation of the positioning time signal of the artificial satellite in the GCS shown in FIG. 4 will now be described with reference to FIGS. 4 and 6.

The standard time device 123 in the GCS is a highly precise and stable atomic frequency standard (atomic clock) using rubidium (Rb) or cesium (Cs) and the time off the standard time device 123 slaves to the national standard time. Hence, the accuracy of the time can be maintained. The integral second pulse 123a of the standard time is obtained from the standard time device 123. On the basis of this timing, the time correction of the positioning time signal on the artificial satellite is carried out.

The positioning time signal of the artificial satellite is included in the positioning signal, and the positioning signal 106a is transmitted from the transmitter part 132 to the receiver part 133 of the GCS via the hybrid circuit 102, the antenna 101, the down link 110, the GCS antenna 111 and the hybrid circuit 129. In the receiver part 133, the positioning time signal 100a included in the positioning signal 106a is regenerated as the PN code 113a in the PN code decoder circuit 113 to output the PN code 113a to the comparator circuit 114. The PN code 113a is delayed by the propagation time corresponding to the range between the artificial satellite and the GCS with respect to the positioning time signal 100a. The range between the GCS and the artificial satellite is measured by the range measuring system of the GCS shown in FIG. 3, and the value calculated in the range calculator 75 is transferred to the range register circuit 117. In the range delay circuit 119, on the basis of the standard time integral second pulse 123a output from the standard time device 123, the time corresponding to the radio wave propagation time between the GCS and the artificial satellite is counted by a clock pulse, that is, a propagation delay equivalent time pulse 117a is output from the range register circuit 117 to output a delay standard pulse 119a to the pseudo receive PN coder circuit 115. The delay standard pulse 119a corresponds to the integral pulse of the time on the artificial satellite.

In response to the delay standard pulse 119a, the pseudo receive PN coder circuit 115 outputs a pseudo receive PN code 115a to the comparator circuit 114. In the comparator circuit 114, the PN code 113a output from the PN code decoder circuit 113 and the pseudo receive PN code 115a output from the pseudo receive PN coder circuit 115 are compared with each other to detect a phase difference therebetween. From this phase difference, a time error signal is obtained in the error generator circuit 125, and the time error signal is coded to obtain the command signal for the time correction in the error coding circuit 126. The command signal for the time correction is transmitted to the artificial satellite via the transmitter part 134, the hybrid circuit 129, the GCS antenna 111 and the up link 109.

In the artificial satellite, the command decoder circuit 104 of the receiver part 131 generates the time correction signal 104a from the command signal for the time correction, and the time correction of the positioning time signal of the artificial satellite is carried out, as described above.

As described above, the time included in the positioning signal of each artificial satellite is always compared with the time obtained by delaying the standard time of the standard time device of the GCS by the radio wave propagation time corresponding to the range between the GCS and the artificial satellite to detect the time error and the time correction command signal is generated on the basis of the time error. The obtained time correction command signal is transmitted to the artificial satellite in order to correct the time of the positioning signal of the artificial satellite, and thus the time of the positioning time signal included in the positioning signal of the artificial satellite is always allowed to be coincident with the standard time of the GCS to maintain the accuracy of the time.

In this case, for the range information between the GCS and each artificial satellite, required for the time correction, the value directly measured in real time is used and it is not necessary to obtain the orbit determination and prediction of the artificial satellite. Hence, error elements are less.

Next, an orbit of an artificial satellite in this embodiment will now be described.

In order to construct the positioning system, it is necessary to use a combination of a plurality of artificial satellites. The orbit of each artificial satellite can be expressed by orbital ephemeris $E_k$ as follows:

$$E_k = (T_k, a_k, e_k, i_k, \Omega_k, \omega_k) \quad (1)$$

k: Number of artificial satellite
T: perigee pass standard time
a: orbital semimajor axis
e: eccentricity
i: orbital inclination
$\Omega$: longitude of ascending node
$\omega$: perigee argument Among a plurality of artificial satellites, there is a relationship as follows:

$$T_k = T_1 - (P/3) \cdot k$$
$$a_k = a_1$$
$$e_k = e_1$$
$$i_k = i_1 \quad (2)$$
$$\Omega_k = \Omega_1 + (360°/n) \cdot k$$
$$\omega_k = \omega_1$$

wherein $k = 1, 2 \ldots n$.

Figure 7:
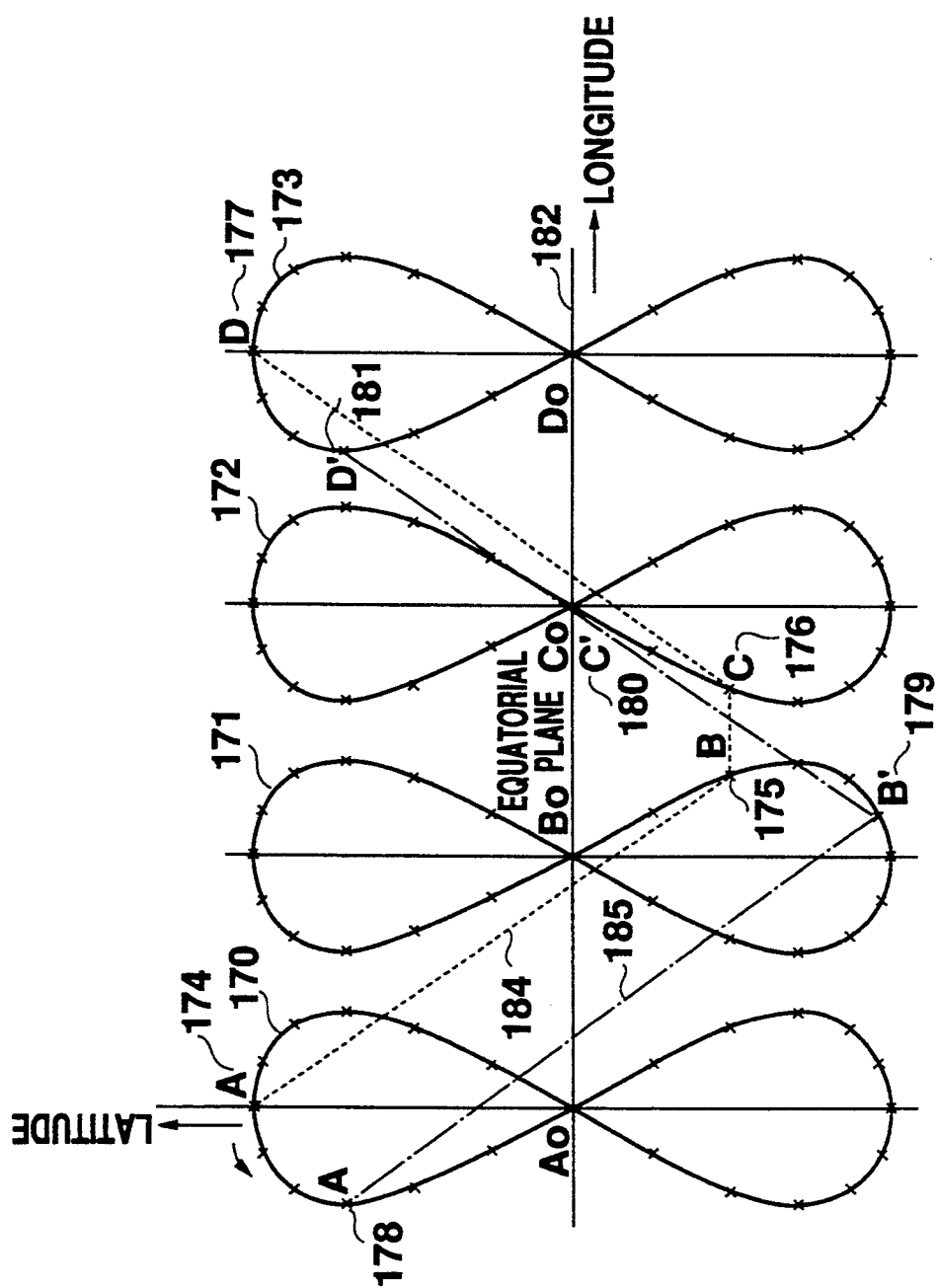
FIG. 7 is a schematic view showing orbits, projected onto a ground surface, of artificial satellites of a positioning system utilizing artificial satellites according to the present invention.

FIG. 7 shows the orbits of the artificial satellites represented in equation (1), the orbits being projected onto the ground surface. FIG. 7 exemplifies a case of four artificial satellites.

As shown in FIG. 7, numerals 170, 171, 172 and 173 denote the loci on the ground for showing the figure-eight characteristic of the four artificial satellites A, B, C and D, numerals 174, 175, 176 and 177 indicate the positions of the four artificial satellites at a time $T_a$, and numerals 178, 179, 180 and 181 indicate other positions of the four artificial satellites at another time $T_b$. Crossing points Ao, Bo, Co and Do of the four loci intersect with the equatorial plane 182. Numerals 184 and 185 denote base lines coupling the positions of the artificial satellites at the times $T_a$ and $T_b$. In these loci, the phase of the adjacent two artificial satellites is always separated by 120 degrees, and the base lines connecting the positions of the four artificial satellites are shown by polygonal lines.

Normally, no matter when the artificial satellites are positioned at any time of the figure-eight characteristic, the base lines sufficiently spread across the earth, and seen from the observer located on or near the ground surface, the four artificial satellites can be considered as network on the ground.

In this embodiment, when the four artificial satellites are placed in the quasi-geosynchronous altitude orbits having an orbital inclination angle of at least 5 degrees to at most 18 degrees and a stationary altitude so that the mean anomalies of the adjacent artificial satellites may be a difference of 120 degrees and the artificial satellites may be arranged at almost equal longitudinal intervals on the equatorial plane within a visible area from the GCS, the number of GCSs necessary for controlling the four artificial satellites is one. Also, when at least 9 to approximately 12 artificial satellites are placed under the same condition as described above, the number of the GCSs necessary for controlling at least 9 to approximately 12 artificial satellites is at least 3.

In the former case, the four artificial satellites can be placed and a positioning available area where at least four artificial satellites are visible to the observer can be formed in a predetermined region.

In the latter case, a global positioning available area where at least four artificial satellites are visible to the observer can be formed in any region except the polar or high latitude regions.

The second embodiment:

FIG. 8 is a block diagram of an antenna device of the GCS of the second embodiment of a positioning system utilizing artificial satellites according to the present invention. FIG. 8 shows a case where the four artificial satellites always visible from the GCS are the objects to be controlled.

In this case, in comparison with an installation of four independent GCS antennas directed towards the artificial satellites from the GCSs, it is sufficient to install only one antenna structure and thus a positioning system utilizing artificial satellites with a simplified GCS antenna device can be obtained. The construction and the operation of this positioning system utilizing the artificial satellites except the GCS antenna device are the same as the above-described first embodiment shown in FIGS. 3 and 4 and hence the description thereof can be deleted for conciseness.

In FIG. 8, numerals 200, 201, 202 and 203 denote the artificial satellites A, B, C and D, respectively, numerals 204, 206, 208 and 210 designate up links, and numerals 205, 207, 209 and 211 designate down links. In the GCS, a multibeam antenna part 245 includes a plurality of element antennas 212 to 218, and a hybrid circuit part 246 includes a plurality of hybrid circuits 219 to 225. An amplifier part 247 includes a plurality of low noise amplifiers 226 to 232 and a plurality of high power amplifiers 233 to 239. The GCS further includes a beam forming network 240, a phase shifter 241, a power divider 242 and a switch 243.

First, the down link will be described. The signals received by the element antennas 212 to 218 are separated into the hybrid circuits 219 to 225, and the outputs of the hybrid circuits 219 to 225 are amplified in the low noise amplifiers 226 to 232. The outputs of the low noise amplifiers 226 to 232 are input to the beam forming network 240. In the beam forming network 240, the radio waves transmitted from the artificial satellites A, B, C and D are received to output four received signals from four independent terminals. From each terminal, the output from each artificial satellite can be continuously acquired.

Next, the up link will be described. In the up link, one of the four transmission outputs for the four artificial satellites is selected by the switch 243. The power divider 242 equally distributes and transmits the selected transmission output to the element antennas 212 to 218. The phase shifter 241 executes a phase control so that the transmission beam can be directed toward the targeted artificial satellite of the transmission signal selected by the switch 243. Power amplification, including an amplitude control of the respective phase-shifted outputs, is carried out in the respective high power amplifiers 233 to 239 to output the respective amplified outputs to the respective hybrid circuits 219 to 225 coupled with the respective element antennas 212 to 218. The transmission signals are transmitted from the element antennas 212 to 218 toward the targeted artificial satellite.

As described above, on receiving, the signals off the plurality of artificial satellites can be received at the same time, and on transmitting, the signals can be transmitted to the respective artificial satellites by time shared control. Of time slots to be allocated for controlling one artificial satellite by the GCS, the earliest time slot is used for a decoding of the received signals and a lock-on of an RF signals, and in consideration of this, the time slots are decided. In the period where no time slot is allocated, by carrying out presumption on the basis of a previous situation, the time required for the decoding of the received signals and the lock-on of the RF signals can be reduced.

Figure 9:
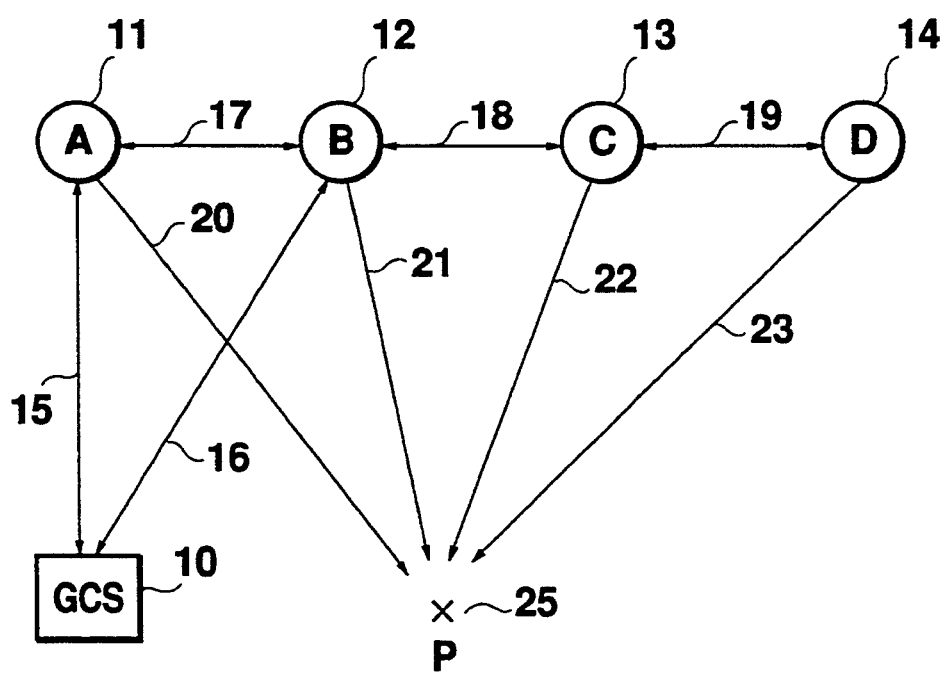
FIG. 9 is a schematic view showing communication channels including the intersatellite communication of a third embodiment of a positioning system utilizing artificial satellites according to the present invention.
Figure 10:
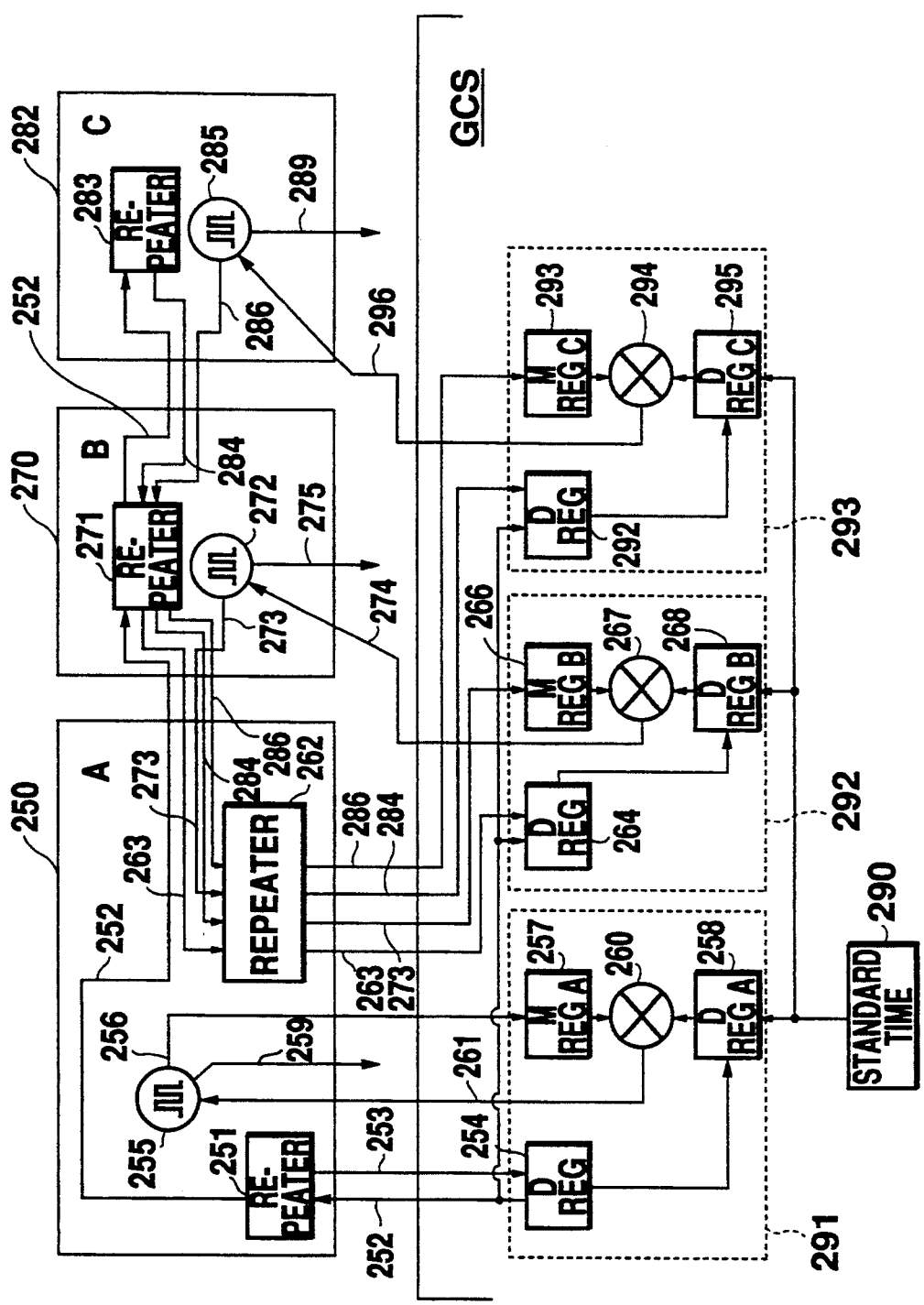
FIG. 10 is a block diagram of an essential part of a GCS and the artificial satellites shown in FIG. 9.

The third embodiment:

FIG. 9 shows communication channels of the third embodiment of a positioning system utilizing artificial satellites according to the present invention. FIG. 10 shows an essential part of the GCS and the artificial satellites shown in FIG. 9 except the artificial satellite (D) 14.

In FIG. 9, a numeral 10 denotes the GCS and numerals 11 to 14 designate the artificial satellites A, B, C and D. A numeral 15 denotes a feeder link. Now, the artificial satellite 11 coupled with the GCS 10 by the feeder link 15 is called a specific artificial satellite. A TT&C channel 16 is present between the GCS 10 and the artificial satellite 12 (other TT&C channels between the GCS and the other artificial satellites are not shown). Intersatellite communication channels 17 to 19 are provided between the artificial satellites 11 to 14, and there are provided propagation paths 20 to 23 through which the positioning signals are transmitted from the respective artificial satellites 11 to 14 to the observation point (P) 25.

Next, the correction of the times included in the positioning signals of at least four artificial satellites always present in the visible area from the GCS by using the communication channels between the specific artificial satellite and the adjacent artificial satellites will be described in connection with FIG. 9.

First, the range measuring between the GCS and the artificial satellites will be described. In this case, the example where four artificial satellites are used is shown.

(1) The range measuring signals are transmitted from the GCS to the specific artificial satellite (A) 11 via the feeder link 15 and are then successively transmitted to the other artificial satellites 12, 13 and 14 via the intersatellite communication channels 17 to 19 therebetween.

(2) When the artificial satellites receive the range measuring signals transmitted from the GCS 10, the artificial satellites return parts of the respective range measuring signals to the GCS 10 via the same paths.

(3) In the GCS 10, in the same manner as the first embodiment shown in FIG. 3, on the basis of the range measuring signals transmitted from the GCS 10 to the artificial satellites at the transmitting timing and the range measuring signals returned to the GCS 10 from the respective artificial satellites, the range between the GCS 10 and the respective artificial satellites along the paths of the range measuring signals can be measured in real time.

Next, the outline of the error detection by the comparison between the standard time of the GCS 10 and the times of the positioning time signals of the respective artificial satellites and the time correction of the positioning time signals of the artificial satellites on the basis of the error detection result will be described.

(4) The positioning signals of the artificial satellites are transmitted from the artificial satellites to the predetermined positioning available area such as the observation point P and simultaneously the positioning signals are also transmitted from the specific artificial satellite directly to the GCS and from the other artificial satellites to the GCS via the communication channels between the artificial satellites.

(5) On the other hand, from the standard time of the standard time device of the GCS, the times delayed by the radio wave propagation times corresponding to the range actually measured in (3) along the measuring paths between the GCS and the respective artificial satellites can be obtained.

(6) The phase difference between the two signals obtained in (4) and (5) is detected to obtain the error signals and the time correction commands for correcting the times of the positioning signals of the artificial satellites are generated. The time correction commands are transmitted from the GCS to the respective artificial satellites via the TT&C channels and the time correction of the positioning signals of the artificial satellites can be performed using the same principle described in the first embodiment as shown in FIG. 4.

Next, the operation of the essential part of the GCS and the artificial satellites shown in FIG. 9 will now be described with reference to FIG. 10.

In FIG. 10, numerals 250, 270 and 282 designate the artificial satellites A, B and C, numerals 251, 262. 271 and 283 denote repeaters installed on the artificial satellites, and numerals 255, 272 and 285 denote positioning signal generators installed on the artificial satellites. A plurality of range (D) registers 254, 264 and 292 of the GCS store the measured range values between the GCS and the artificial satellites. A plurality of range measuring (M) registers (A), (B) and (C) 257, 266 and 293 of the GCS store the positioning time signals (receive PN code signals) transmitted from the respective artificial satellites A, B and C. A plurality of range (D) registers (A), (B) and (C) 258, 268 and 295 of the GCS store the signals (pseudo receive PN code signals) obtained by delaying the standard time of the GCS by the radio wave propagation times corresponding to the range along the measuring paths between the GCS and the respective artificial satellites. A plurality of comparators 260, 267 and 294 compare the phase difference between the receive PN codes and the pseudo receive PN codes to detect time errors, and a standard time device 290 outputs the standard time.

First, the artificial satellite (A) 250 will be described. That is, relating to the range between the GCS and the artificial satellite (A) 250, as described in the first embodiment, the range data measured at real time are stored in the range register 254. The range register 254 of the GCS, the repeater 251 of the artificial satellite (A) 250, the up link 252 and the down link 253 shown in FIG. 10 typically show the range time system of the GCS and the artificial satellite in the positioning system utilizing the artificial satellites shown in FIG. 3.

Although for the up link 252 and the down link 253, usually, the TT&C channel is used, since in the artificial satellites having the feeder link, the higher quality transmission can be performed by using the feeder link rather than the TT&C channel, the feeder link is preferably used in this embodiment.

The positioning signal generator 255 of the artificial satellite (A) 250, the down link 256, the up link 261, the range measuring register (A) 257, the range register (A) 258 and the comparator 260 shown in FIG. 10 typically show the positioning time system of the GCS and the artificial satellite in the positioning system utilizing the artificial satellites shown in FIG. 4.

The positioning time signal of the artificial satellite (A) 250 is transmitted to the range measuring register (A) 257 of the GCS via the feeder link and the range measuring register (A) 257 regenerates and stores the receive PN code. In turn, the range register (A) 258 stores the pseudo receive PN code generated from the standard time of the standard time device of the GCS and the range data of the range register 254. The phases of the receive PN code and the pseudo receive PN code are compared in the comparator 260 to detect the error signal and the detected error signal is transmitted as the time correction command signal to the artificial satellite (A) 250 via the up link 261. Hence the time correction of the positioning time signal of the artificial satellite (A) 250 is carried out in the same manner as the above-described first embodiment. The time correction of the positioning time signals of the artificial satellites B and C can be also performed in the same manner as described above.

As regards the repeaters 251, 262,271 and 283 of tile artificial satellites, in comparison with a system for amplifying and retransmitting the received signal, in the case that the received signal is the PN code, a PCM regeneration system can more effectively prevent the quality degradation in the signal transmission.

Figure 11:
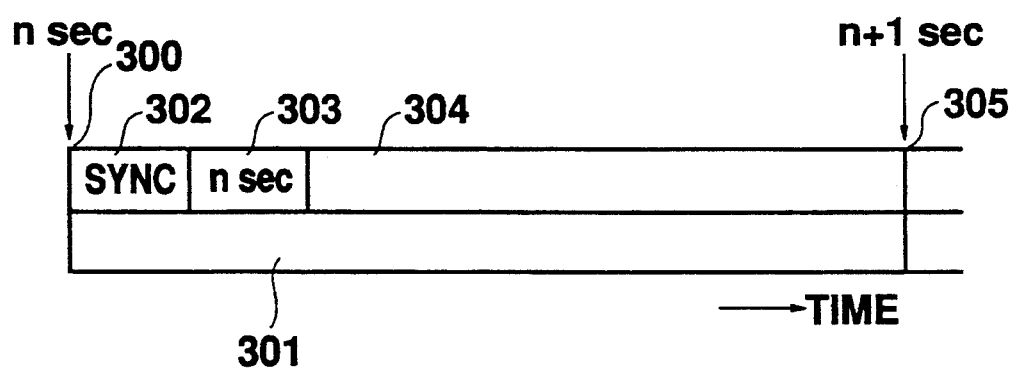
FIG. 11 is a schematic view showing one example of a data format of a positioning signal used in a positioning system utilizing artificial satellites according to the present invention.

FIG. 11 illustrates one example of a data format of a positioning signal to be used in the first, second and third embodiment described above.

In FIG. 11, numerals denote such as an n second integral second time 300, a positioning time signal (PN code signal) 301, a synchronous code 302, an absolute time 303 at the n second integral second time, orbital information 304 of the artificial satellites and equipments installed thereon and states of the positioning signals, and absolute time +1 second 305 at the n second integral second time.

The positioning time signal 301 is started at the n second integral second time, and the position of its head pulse is clearly indicated by the synchronous code 302. The absolute time 303 at the n second integral second time is indicated by n second display data. The information 304 includes the orbital information of the artificial satellites and the status information of the artificial satellites and the equipments installed thereon. The positioning time signal 301 and the telemetry data 302, 303 and 304 are orthogonally modulated and are transmitted by the same carrier wave. One example of the data format of this positioning signal is shown for explaining the principle.

In the positioning system utilizing the artificial satellites according to the present invention, a positioning algorithm the observer possesses is similar to the conventional positioning system (GPS) utilizing the artificial satellites, and since this is not a range difference measuring system, by setting the data format of the positioning signals to the same as the GPS, the observer can perform the positioning by the same processing. That is, the positioning system utilizing the artificial satellites of the present invention can also be adapted to the conventional positioning system utilizing the artificial satellites.

The fourth embodiment:

An orbital condition of artificial satellites to be used in the fourth embodiment of a positioning system utilizing the artificial satellites according to the present invention will now be described. In the first embodiment, the orbit of each artificial satellite is expressed by equation (1), and the relationship among a plurality of artificial satellites is represented by equations (2).

By the condition of the aforementioned equations (2), looking from the observer, the state of the artificial satellites spreading in the space can be brought about, but by the geometrical arrangement of the artificial satellites in the space varying with the passage of time, the degradation of the position fix accuracy or the occurrence of the impossible positional fix can be caused. The degree of the degradation of the positional fix accuracy determined by the geometrical arrangement of the plurality of artificial satellites is called "GDOP (geometric dilution of precision)" and is expressed in equation (3).

$$\text{GODP} = [\text{TRACE } (G^T \cdot G)^{-1}]^{\frac{1}{2}} \qquad (3)$$

wherein $$G = \begin{pmatrix} l_1 m_1 n_1 - 1 \\ l_2 m_2 n_2 - 1 \\ l_3 m_3 n_3 - 1 \\ l_4 m_4 n_4 - 1 \end{pmatrix}$$

wherein $l_1$, $m_1$ and $n_1$ represent three orthogonal components along unit vectors when the observer looks at an i-th artificial satellite (i=1, 2, 3 and 4). The derivation of equation (3) of the GDOP is disclosed in detail in "GPS Precise Positioning System by Artificial Satellites", edited by The Institute of Japan Geodesy, pp. 129-145, November, 1986, and "A Satellite Selection Method and Accuracy for the Global Positioning System" by M. Kihara and T. Okuda, Navigation, Journal of the Institute of Navigation, Vol. 31. No. 1, pp. 8-20, Spring 1984.

In order to reduce the value of the GDOP represented in equation (3), it is necessary not only to spread the four artificial satellites in the space as wider as possible but also to give a three-dimensional expansion. Accordingly, the fourth embodiment, to equations (1) and (2) in the first embodiment, biases are supplemented to obtain equation (4).

$$T_k' = T_1 - (P/3)(k-1) + \theta_k - m(P/8)_k$$

$$a_k = a_1$$

$$e_k = e_1$$

$$k_k = i_k \qquad (4)$$

$$\Omega_k' = \Omega_1 + (360°/n) \cdot k + \Delta\Omega_k$$

$$\omega_k = \omega_1$$

In equations (4), a, e, i and ω are the same as those in equations (1) and (2) in the first embodiment. $T_k'$, $\theta_k$, $-m(P/8)_k$ and $\Omega_k'$ will be described hereinafter.

In comparison with equations (2) in the first embodiment described above, the difference of equations (4) in this embodiment will now be described.

At the perigee pass standard time $T_k'$ of equations (4), $\theta_k$ and $-m(P/8)_k$ are newly added.

$T_k - T_{k+1}'$ is the time difference of the perigee pass time of the artificial satellites, that is, in the orbits of the same types, viewed from another angle, and it can be defined as a difference between mean anomalies by considering that the perigee is moved.

In this case, to the above-described value, on the basis of 120 degrees, by $\theta_k$ and $-m(P/8)_k$, a predetermined angle of bias value is given for every artificial satellite. The angle of 120 degrees is an element for giving a two-dimensional expansion to a plurality of artificial satellites, and simultaneously, in order to bring about a three-dimensional spread to the positional relationship of the artificial satellites without largely changing the positions of the artificial satellites, the bias value $\theta_k$ is selected so that the mean anomalies of the adjacent artificial satellites may be within approximately ±20% on the basis of the difference of 120 degrees.

On the other hand, P indicates a cycle or period, and it is assumed that $m(P/8)_k$ (wherein m=0,±1,±2,±4) represents 0, or a value of integral times of ±(P/8) and will be determined individually every artificial satellite.

The k-th artificial satellite selecting the value of either m(P/8) or −m(P/8) indicates that the artificial satellite without m(P/8) or −m(P/8) is given with the bias value of integral times of +45 or −45 degrees with respect to the mean anomalies of the artificial satellites and is moved. By this bias value, the arrangement relationship among the artificial satellites can be spread three-dimensionally. Accordingly, the bias value having a semi-random characteristic can be given to the mutual relationship of the mean anomalies among the n number of artificial satellites.

Although the range of the orbital inclination angle $i_k$ in equations (2) is determined from at least 5 degrees to at most 18 degrees in the first embodiment, as seen from the observer, giving of the change to the value of the orbital inclination angle contributes to the increase of the three-dimensional arrangement.

In the fourth embodiment, the orbital inclination angle $i_k$ of the artificial satellite is determined to $i_k$ because it can be possible to give the different orbital inclination angle to each artificial satellite and to make a combination of several kinds of large orbital inclination angles and small orbital inclination angles. In the case of the small orbital inclination angle, for example, at 5 degrees, a wide view in the north to south directions can always be obtained, but with poor three-dimensional expansion. On the other hand, in the case of the large orbital inclination angle, for instance, at the value beyond 18 degrees, reaching from 30 degrees up to 40 degrees, a large three-dimensional spread can be expected, but the time band where the view offsets in one hemisphere is increased.

In equations (4) in the fourth embodiment, the bias value $\Delta\Omega_k$ is added to the ascending node $\Omega_k'$. In equations (2) in the first embodiment, the ascending node positions of the artificial satellites are determined for every equal angle (360°/n) with respect to the n number of artificial satellites. However, in such a regular arrangement case, the three-dimensional expansion is not always given and hence by giving the bias value $\Delta\Omega_k$ to the individual ascending node positions for every artificial satellite, the three-dimensional spread can be given.

Figure 12:
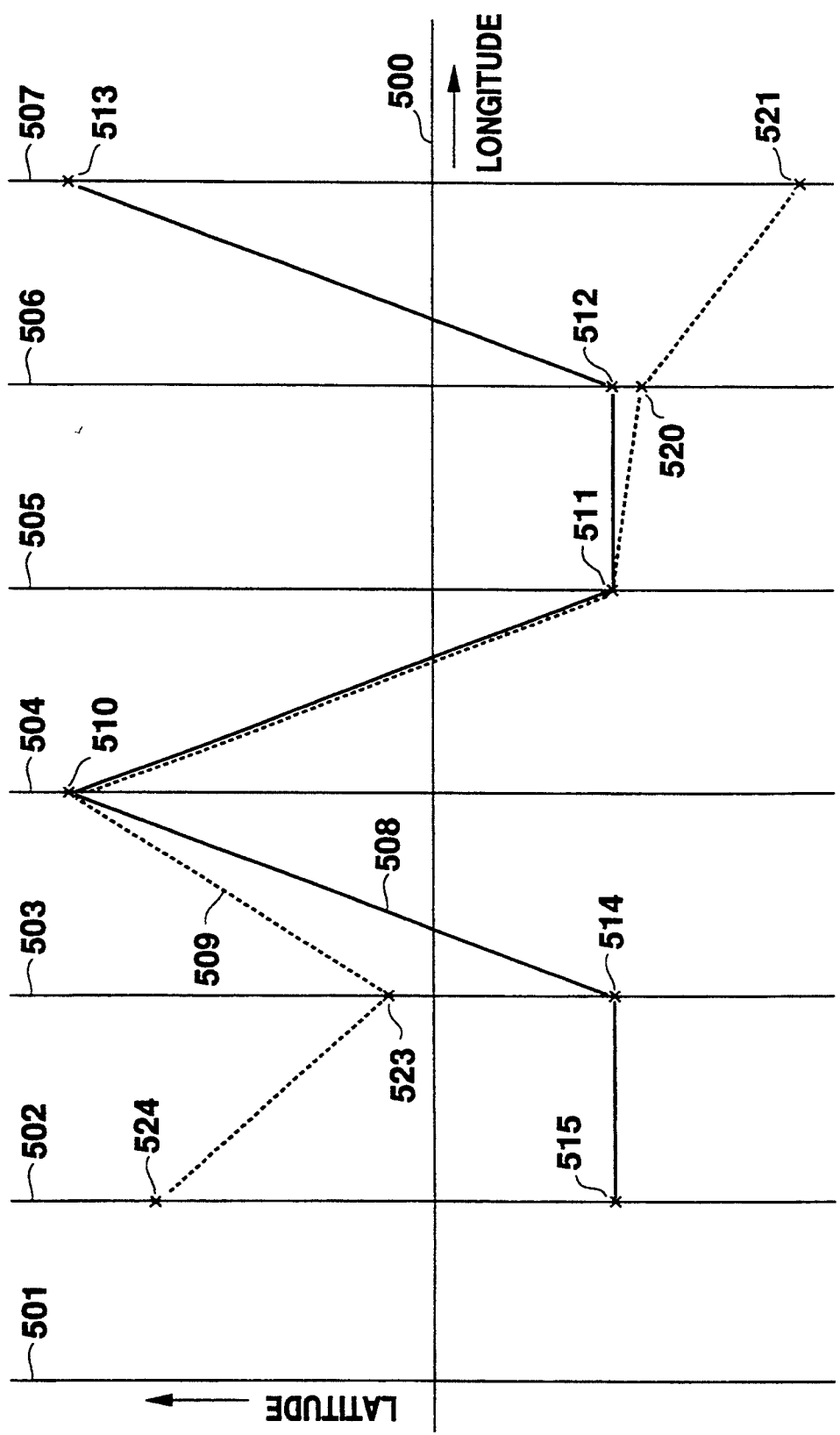
FIG. 12 is a schematic explanatory view showing orbits and positions of artificial satellites in a fourth embodiment of a positioning system utilizing artificial satellites according to the present invention.

FIG. 12 shows one example of the orbits and positions of the artificial satellites in the fourth embodiment of the positioning system utilizing the artificial satellites according to the present invention.

In FIG. 12, an axis 500 indicates the equator at 0 latitude, and axes 501 to 507 indicate longitudes. At the longitudes 502 to 507, the artificial satellites are placed. A solid line 508 indicates a connection line of the artificial satellites in the orbits when no bias value is given to the standard values, and a broken line 509 indicates a connection line of the artificial satellites in the orbits when the bias values are given to the standard values. Numerals 510 to 525 indicate the positions of the artificial satellites when no bias value is given to the standard values, and numerals 520, 521, 523 and 524 indicate the positions of the artificial satellites when the bias values are given to the standard values.

Next, a case where the bias values are given to the standard values of the orbits and positions of the artificial satellites in the fourth embodiment will now be described with reference to FIG. 12 in comparison with a case where no bias value is given to the standard values in the first embodiment.

In the geometrical arrangement of the artificial satellites, as described in the first embodiment, the mean anomalies of the adjacent artificial satellites is the difference of 120 degrees and by determining to 8 hours difference, a symmetrical pattern is exhibited as shown by the solid line 508 connecting the adjacent artificial satellites.

However, by giving the bias values to the standard values of the orbits and positions of the artificial satellites, for example, the geometrical position 512 of the artificial satellite is moved to the position 520 by a 0.4 hour delay in terms of time conversion, and the position 513 is moved to the position 521 by 12 hours advance or delay. Similarly, the position 514 is moved to the position 523 by 10.5 hours delay, and the position 515 is moved to the position 524 by 13.2 hours advance. That is, by adding the bias values on the basis of the solid line 508, the line 508 connecting the positions of the artificial satellites is moved to the broken line 509 to exhibit an asymmetric pattern.

Further, although, as the orbital inclination angle of each artificial satellite is determined to the same value, the geometrical arrangement of the plurality of artificial satellites is considered, in the same manner as giving the bias values to the standard values of the mean anomalies, the asymmetry can be given by imparting the different orbital inclination angles to the artificial satellites.

In this case, when the position of the artificial satellite is moved in the latitude direction in FIG. 12, it roughly shows that the orbit of the artificial satellite is linearly varied, but in fact, according to the figure-eight characteristic, with the variation in the latitude direction, the position is also moved in the longitude direction. In particular, when the orbital inclination angle of the artificial satellite is determined to at least 30 degrees, with a fairly remarkable movement in the longitude direction, the swelling of the figure-eight characteristic is increased. This phenomenon can be used to give asymmetry.

As described above, in this embodiment, by adding the biases as shown in equations (4), the positioning system utilizing the artificial satellites, capable of reducing the GDOP (geometric dilution of precision) can be obtained.

Figure 13:
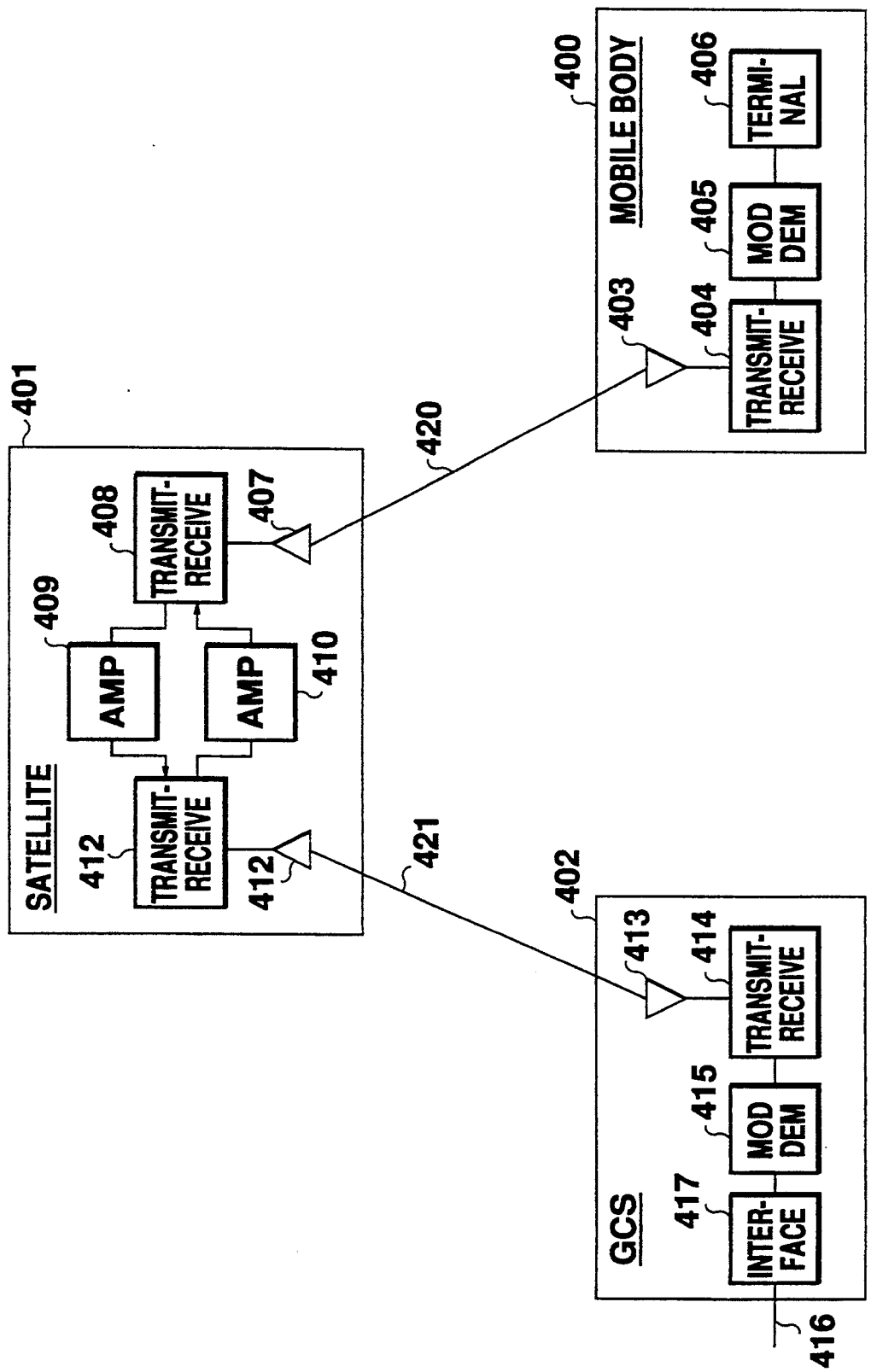
FIG. 13 is a block diagram of a fifth embodiment of a positioning system utilizing artificial satellites having communication means according to the present invention.

The fifth embodiment:

FIG. 13 shows the fifth embodiment of a positioning system utilizing artificial satellites having communication means according to the present invention.

In FIG. 13, a mobile body 400 includes a communication terminal device, and a specific artificial satellite 401 of a positioning system (positioning artificial satellite having a GCS and a feeder link), including a mobile satellite communication repeater. In FIG. 13, a positioning device installed on the specific artificial satellite is not shown. A GCS 402 of the positioning system includes a transmitter-receiver for the satellite communication. FIG. 13, a positioning device installed on the GCS is not shown. The mobile body 400 includes an antenna 403, a transmitter-receiver 404, a modulator-demodulator 405 and a communication terminal device 406. The specific artificial satellite 401 includes two antennas 407 and 412, two transmitter-receivers 408 and 411 and two amplifiers 409 and 410. The GCS 402 includes an antenna 413, a transmitter-receiver 414, a modulator-demodulator 415 and an interface 417 connected to an external connection channel 416. Numeral 420 and 421 denote a feeder link.

Next, the operation of the above-described system will be described with reference to its example as an air satellite communication in connection with FIG. 13.

In this embodiment, the moving body 400 is an aircraft. When the aircraft exists in a positioning available area, the observation of the positioning can be carried out within the aircraft and the communication terminal device installed on the aircraft and the GCS (or a communication party connected to the GCS) can mutually communicate in both directions. In the ease of aircraft, there are communication demands such as air traffic control communication, flight control communication, air service communication, public communication and the like. The communication terminal device 406 can deal with communications such as a telephone, data communication, image communication, facsimile communication and The like.

In the mobile body 400, the transmission signal is transmitted from the communication terminal device 406 to the specific artificial satellite 401 having the mobile satellite communication repeater via the modulator-demodulator 405, the transmitter-receiver 404 and antenna 403. On the other hand, the received signal is moved in the reverse path to the communication terminal device 406 via the antenna 403, the transmitter-receiver 404 and the modulator-demodulator 405.

The specific artificial satellite 401 for positioning is placed in a quasi-geosynchronous altitude orbit having a large orbital inclination angle and a stationary altitude, and thus always stays in an area visible from the GCS and the mobile body within the positioning available area. As a result, the setting of the communication channels can be readily carried out. The specific artificial satellite 401 is provided with the positioning device and the mobile satellite communication repeater. The feeder link 420 is installed between the mobile body 400 and the artificial satellite 401, and the feeder link 421 is installed between the artificial satellite 401 and the GCS 402. When the channel is established from the communication terminal device 406 of the mobile body 400 to the GCS 402, via the antenna 407, the receive signal received in the transmitter-receiver 408 is amplified in the amplifier 409 and the amplified signal is transmitted from the transmitter-receiver 411 to the GCS 402 via the antenna 412.

When the channel is established from the GCS 402 to the mobile body 400, by following up the reverse path, via the antenna 412 of the specific artificial satellite 401, the receive signal received in the transmitter-receiver 411 is amplified in the amplifier 410 and the amplified signal is transmitted from the transmitter-receiver 408 to the mobile body 400 via the antenna 407. The GCS 402 is formed with the positioning device and a mobile satellite communication device. The GCS 402 is provided with the interface 417 for coupling with the external connection channel 416 such as an exclusive communication channel, a public communication network or the like.

Figure 14:
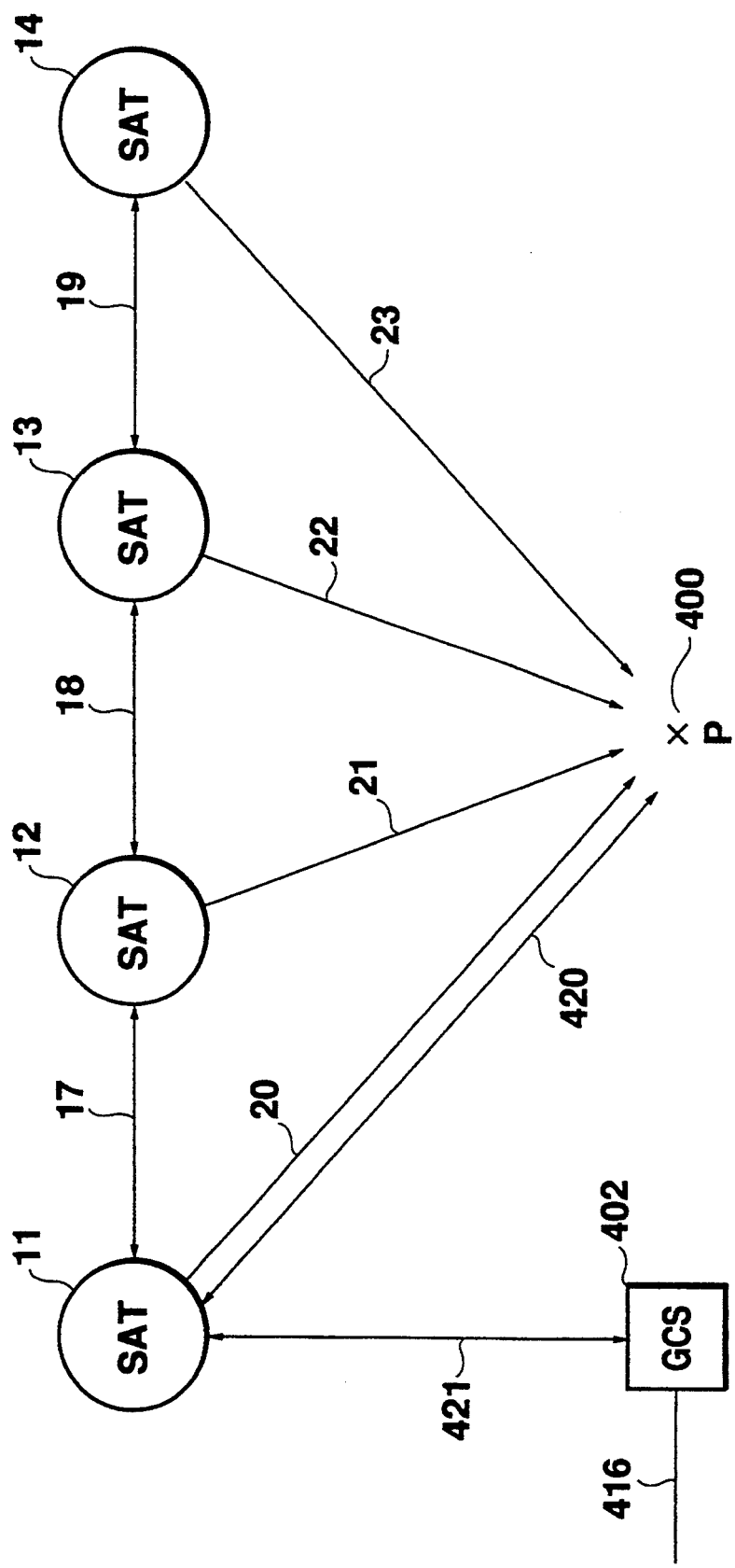
FIG. 14 is a schematic view showing communication channels in a sixth embodiment of a positioning system utilizing artificial satellites having communication means according to the present invention.

The sixth embodiment:

FIG. 14 shows communication channels in the sixth embodiment of a positioning system utilizing artificial satellites having communication means according to -the present invention.

In this embodiment, in the same manner as described above in the positioning system utilizing the artificial satellites in the first to third embodiments, the essential possible positioning condition of the observer at the observation point P is that at least four artificial satellites are always simultaneously visible as seen from the observer.

However, depending on the communication purposes, it is not necessary to always place at least four artificial satellites in the visible area, and it is enough to provide one artificial satellite having a mobile satellite communication repeater in the visible area. Of the four artificial satellites 11 to 14, the specific artificial satellite 11 having the GCS and the feeder link is provided with the positioning device and the mobile satellite communication repeater shown in FIG. 13.

In this embodiment, the positioning system utilizing the artificial satellites, capable of performing the communication between the GCS (or the communication party connected to the GCS) and the mobile body having communication terminal device and carrying out the positioning via the specific artificial satellite in both the directions can be constructed.

Figure 15:
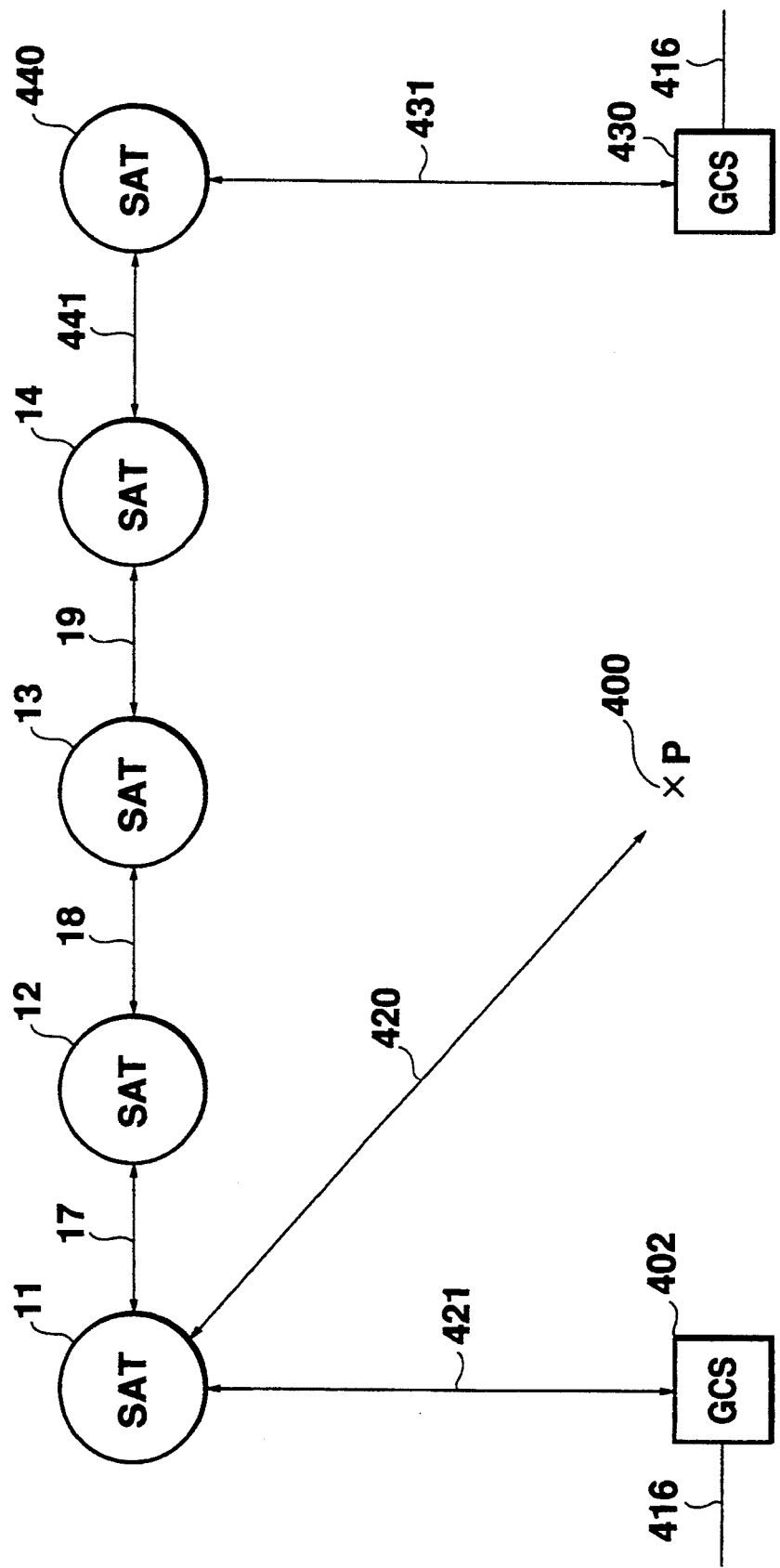
FIG. 15 is a schematic view showing communication channels in a seventh embodiment of a positioning system utilizing artificial satellites having communication means according to the present invention.

The seventh embodiment:

FIG. 15 illustrates communication channels in the seventh embodiment of a positioning system utilizing artificial satellites having communication means according to the present invention.

In comparison with the sixth embodiment exhibiting the positioning system utilizing the artificial satellites and including the communication means with the minimum unit of positioning available area, the seventh embodiment shows one example of the positioning system further including another positioning available area adjacent to the minimum unit of positioning available area.

In this embodiment, the positioning system includes two GCSs 402 and 430, feeder links 421 and 431, external connection channels 416 and 432, and two specific artificial satellites 11 and 440 having the respective GCSs 402 and 430 and the respective feeder links 421 and 431. A plurality of intersatellite communication channels 17, 18, 19 and 441 are provided between the artificial satellites 11 to constituting the positioning system and the specific artificial satellite 440 adjacent thereto.

When the observer at the observation point P including the communication terminal device executes the communication with the GCS (or the communication party connected to the GCS) 402 within the same positioning available area via the artificial satellites in both the directions, the communication purpose can be achieved by using the structure of the communication channels shown in FIG. 14. However, when the observer carries out the communication with the GCS (or the communication party connected to the GCS) 440 within another positioning available area via the artificial satellites, as shown by the construction of the communication channels shown in FIG. 15, the observer at the observation point P including the communication terminal device can perform the communi-cation with the GCS 440 within another positioning available area via the specific artificial satellite having the GCS within the same positioning available area and the feeder link, the intersatellite communication channels for connection between the artificial satellites and the specific artificial satellite within another positioning available area in both directions.

Although the communication channels for coupling between the artificial satellites can transmit the positioning signals in the second embodiment, in this embodiment, the communication channels for connecting between the artificial satellites are provided with a necessary wide band communication channel for covering various kinds of communication.

Figure 16:
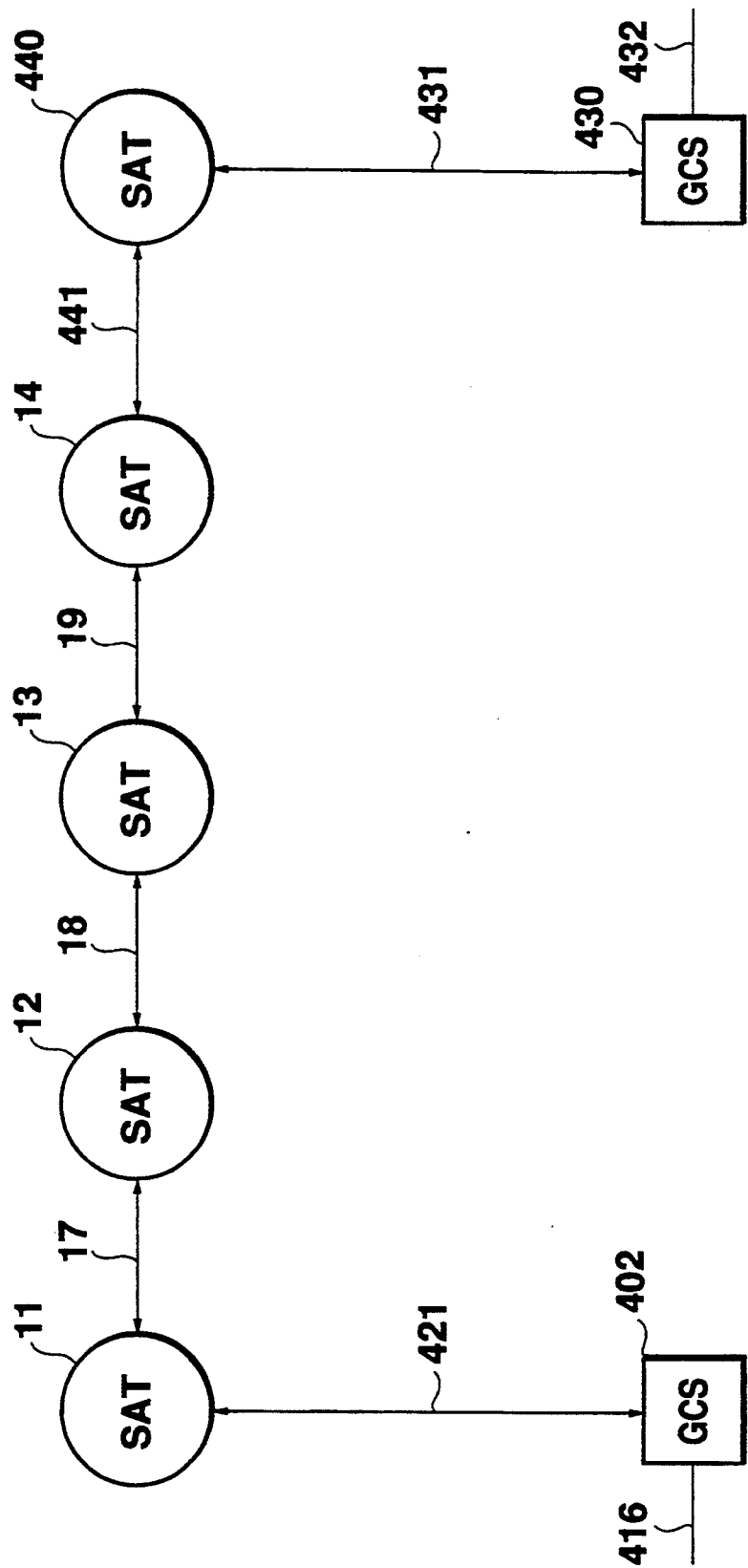
FIG. 16 is a schematic view showing communication channels in an eighth embodiment of a positioning system utilizing artificial satellites having communication means according to the present invention.

The eighth embodiment:

FIG. 16 illustrates communication channels in the eighth embodiment of a positioning system utilizing artificial satellites having communication means according to the present invention.

Although the mobile body having the communication terminal device and the GCS (or the communication party connected to the GCS) are communicated via the artificial satellites in both directions in the fifth to seventh embodiments, in this embodiment, one GCS 402 (or a communication customer connected to the GCS 402) and another GCS 430 (or another communication party connected to the GCS 430) can be communicated via the artificial satellites in both directions.

In this embodiment, in the same manner as the seventh embodiment, the GCSs 402 and 430 of the positioning systems are each provided with a positioning device and a satellite communication device and intersatellite communication channels 17, 18, 19 and 441 are provided between the adjacent artificial satellites 11 to 14 for the positioning and the specific artificial satellite 440.

Figure 17:
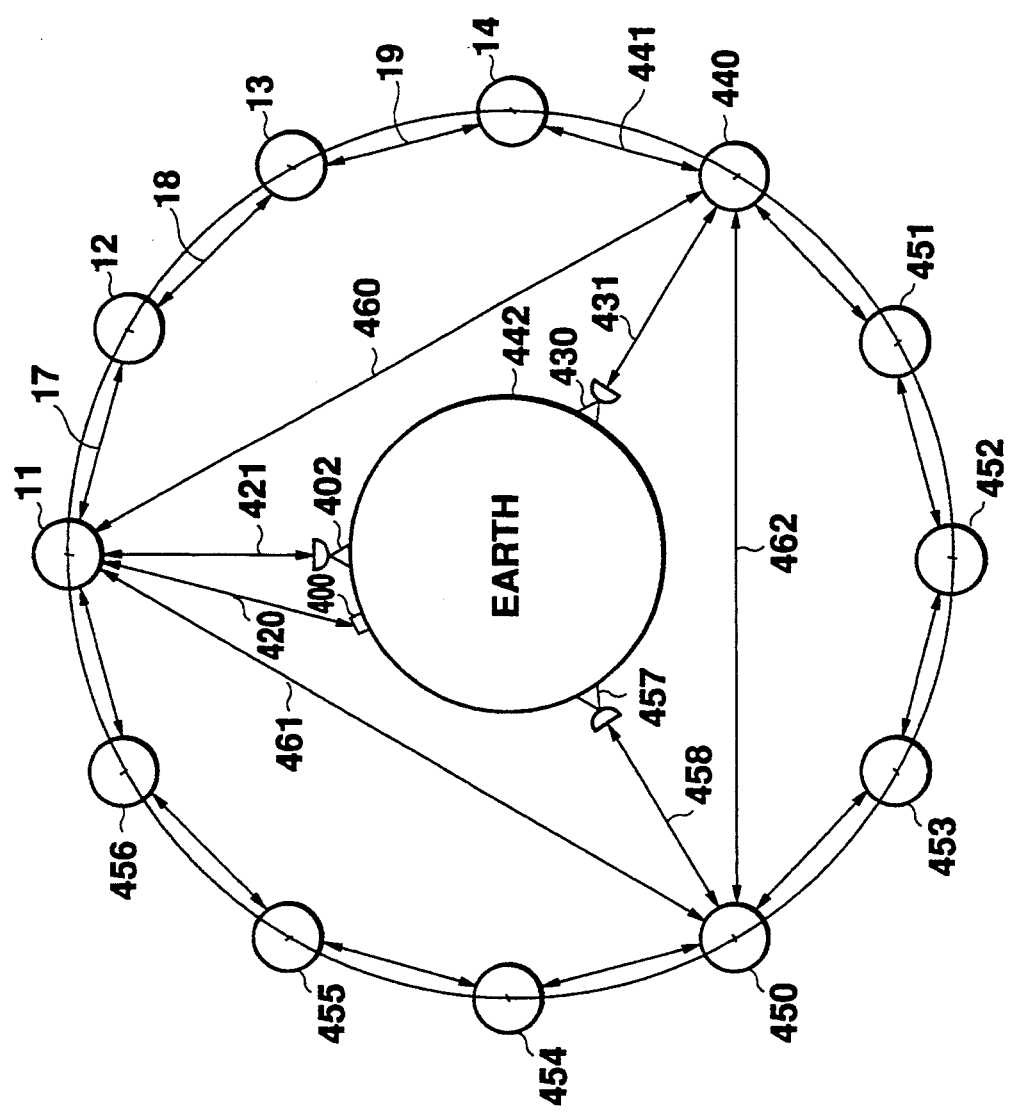
FIG. 17 is a schematic view showing communication channels in a ninth embodiment of a positioning system utilizing artificial satellites having communication means which include intersatellite communication and mobile satellite communication according to the present invention.

The ninth embodiment:

FIG. 17 illustrates communication channels in the ninth embodiment of a positioning system utilizing artificial satellites having communication means according to the present invention. In FIG. 17, there are shown 12 positioning artificial satellites placed in quasi-geosynchronous altitude orbits around the earth, as seen from the north pole.

Although the minimum unit of positioning available area of the positioning system utilizing the artificial satellites is already shown in FIG. 14, in order To form the positioning available area over the full global region, at least 12 artificial satellites for positioning are required. On the other hand, for constructing a global communication network, as known, at least three artificial satellites for the communication are required, and in the case of the INTELSAT satellites, for instance, the three artificial satellites are arranged above the Pacific Ocean, the Atlantic Ocean and the Indian Ocean.

In FIG. 17, 12 artificial satellites 11 to 14, 440 and 450 to 456 constituting the positioning system are placed in an annular form around the earth 442, and the specific artificial satellites 11,440 and 450, each having a GCS 402, 430 or 457 and a feeder link are included in the 12 artificial satellites. In the same manner as described above in connection with FIGS. 3 and 4, the specific artificial satellites are each provided with a positioning device and a mobile body satellite communication device. A mobile body 400 includes a communication terminal device. There are provided intersatellite communication channels for transmitting the positioning signals between the adjacent artificial satellites. Further, between each GCS 402, 430 or 457 and each specific artificial satellite 11, 440 or 450, an intersatellite communication channel 460, 461 or 462 having a necessary wide band for mutual communication between the two members is provided. Numerals 421, 431 and 458 denote a feeder link.

In the above-described positioning system utilizing the artificial satellites and including the communication means, the positioning available area can be globally formed in any place on the earth except a part of the polar regions, and, when the observer stays in the same position as the mobile body 400 having the communication terminal device, the observer and the GCS (or the communication party connected to the GCS) 402 can communicate with each other via the specific artificial satellites in both the directions.

Further, the mobile body 400 can communicate with another GCS (or another communication party connected to the GCS) 430 or 457 from the GCS 402 within the same positioning available area as the mobile body 400 and the specific artificial satellite 11 having the GCS and the feeder link via the intersatellite communication channels 460, 461 and 462 between the specific artificial satellites.

In the ninth embodiment, in the positioning system utilizing the artificial satellites and including the communication means, it is sufficient to provide the mobile satellite communication device on the GCSs and the specific artificial satellites only, and thus the positioning system construction can be simplified by utilizing the common parts in comparison with constructing another communication system.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A positioning system utilizing a plurality of artificial satellites, at least four artificial satellites always existing in a visible area as seen from a ground control station and being placed in quasi-geosynchronous altitude orbits so as to transmit positioning signals to a positioning available area for calculating a position of an observer within the positioning available area from a positioning algorithm of the observer, the positioning system comprising:

the artificial satellites including:
means for returning a positioning signal, transmitted from the ground control station, to the ground control station;
means for generating and outpouring a positioning time signal;
means for correcting a time of the positioning time signal on the basis of a time correction command signal transmitted from the ground control station;
means for receiving a monitored result of a status of the positioning signal transmitted from the ground control station and for outputting a telemetry data signal;
means for multiplexing the positioning time signal and the telemetry data signal and for outputting the positioning signal; and
means for transmitting the positioning signal to a predetermined positioning available area; and a ground control station for controlling the artificial satellites, including:
means for measuring a range between the ground control station and each artificial satellite in real time on the basis of the positioning signal transmitted from the ground control station to each artificial satellite and returned from each artificial satellite;
means for comparing a time delayed standard time signal delayed for a radio wave propagation time corresponding to the range between the ground control station and each artificial satellite with the positioning time signal, transmitted from each artificial satellite, and for outputting an error signal;
means for generating the time correction command signal from the error signal and for transmitting the time correction command signal to each artificial satellite; and
means for always monitoring the status of the positioning signal and for transmitting the monitored result to each artificial satellite;

wherein the time included in the positioning signal of the artificial satellite is corrected so as to always coincide with the standard time of the ground control station, the status of the positioning signal is always monitored to include the monitored result into the positioning signal of the artificial satellite and to provide the monitored result to the observer within the positioning available area, in real time.

2. The positioning system of claim 1, further comprising:

means for receiving, at the same time, signals transmitted from the at least four artificial satellites, always existing in the visible area as seen from the ground control station, and for outputting the received signals to a beam forming network; and
a beam forming network having a plurality of inputs for receiving the received signal, for forming the received signals into at least four independent signals transmitted by the artificial satellites, and for outputting the independent signals;
means for receiving and selecting one of the independent signals, for controlling a phase of the selected signal so as to direct a transmission beam in a destination direction and for transmitting the selected signal to a predetermined artificial satellite.

3. A positioning method utilizing a plurality of artificial satellites, comprising the steps of:

placing at least four artificial satellites in quasi-geosynchronous altitude orbits having a stationary altitude and an orbital inclination angle of at least 5 degrees to at most 18 degrees with respect to an equatorial plane so that mean anomalies of the adjacent artificial satellites are a difference of 120 degrees and approximately at equal longitudinal intervals on the equatorial plane within a visible area as seen from a ground control station; and
forming a positioning available area always including at least four artificial satellites within the visible area as seen from an observer at a predetermined region.

4. A positioning method utilizing a plurality of artificial satellites, comprising the steps of:

placing at least four artificial satellites in quasi-geosynchronous altitude orbits having a stationary altitude and an orbital inclination angle of 20 degrees $\pm 20$ degrees with respect to an equatorial plane so that mean anomalies of the adjacent artificial satellites are a difference of 120 degrees and ascending node positions are set at an equal interval on the equatorial plane within a visible area as seen from a ground control station and such that bias values are added to at least either a difference value of the mean anomalies or the ascending node positions; and
forming a positioning available area always including at least four artificial satellites within the visible area as seen from an observer at a predetermined region, thereby reducing degradation of a positional fix accuracy determined by a geometrical arrangement of the artificial satellites, as seen from the observer.

5. A positioning system utilizing a plurality of artificial satellites, at least four artificial satellites always existing in a visible area as seen from a ground control station and being placed in quasi-geosynchronous altitude orbits so as to transmit positioning signals to a predetermined positioning available area for calculating a position of an observer within the positioning available area from a positioning algorithm of the observer, the positioning system comprising:

the artificial satellites including:
intersatellite communication channels for communicating between the artificial satellites;
means for receiving a positioning signal, transmitted from the ground control station, in a specific artificial satellite, for transmitting the positioning signal to the artificial satellites via the communication channels, and for transmitting back to the ground control station returned positioning signals which are returned by the artificial satellites to the specific satellite via the same communication path;

means for generating and outputting a positioning time signal;

means for transmitting the positioning signal from the specific artificial satellite to the ground control station and for simultaneously transmitting the positioning signals received from the artificial satellites to the ground control station;

means for correcting a time of the positioning time signal on the basis of a time correction command signal transmitted from the ground control station:

means for receiving a monitored result of a status of the positioning signal transmitted from the ground control station and for outputting a telemetry data signal;

means for multiplexing the positioning time signal and the telemetry data signal and for outputting the positioning signal; and means for transmitting the positioning signal to a predetermined positioning available area; and a ground control station for controlling the artificial satellites, including:

means for measuring a range between the ground control station and each artificial satellite, in real time, on the basis of the positioning signal transmitted from the ground control station to the specific artificial satellite and further transmitted from the specific artificial satellite to each artificial satellite and returned back to the ground control station from each of the artificial satellites through the specific artificial satellite;

means for comparing a time delayed standard time signal delayed for a radio wave propagation time corresponding to the range between the ground control station and each artificial satellite with the positioning time signal transmitted from each artificial satellite, and for outputting an error signal;

means for generating the time correction command signal from the error signal and for transmitting the time correction command signal to each artificial satellite; and means for always monitoring the status of the positioning signal and for transmitting the monitored result to each artificial satellite;

wherein the time included in the positioning signal of the artificial satellite is corrected so as to always coincide with the standard time of the ground control station, the status of the positioning signal is always monitored to include the monitored result into the positioning signal of the artificial satellite and to provide the monitored result to the observer within the positioning available area, in real time.

6. The positioning system of claim 5, further comprising:

means for carrying out communication between the specific artificial satellite having a feeder link and a mobile body having a communication terminal device for carrying out positioning; and an interface device for connecting with an external connection channel.

7. A positioning system, comprising:

a plurality of artificial satellites, at least four artificial satellites always existing in a visible area, as seen from a ground control station, and being placed in quasi-geosynchronous altitude orbits, the artificial satellites including:

means for generating a positioning timing signal and for outputting the positioning timing signal;

means for receiving a time correction command signal and the positioning timing signal, for correcting a timing of the positioning timing signals and for outputting the positioning timing signal;

means for receiving an uplink positioning signal including a status of the positioning signal, for converting the status into telemetry data and for outputting the telemetry data signal;

means for receiving the telemetry data signal and the positioning timing signal, for multiplexing the positioning timing signal and the telemetry data signal into a downlink positioning signal and for transmitting the downlink positioning signal in a desired direction;

a ground control station for controlling the artificial satellites, including:

means for receiving the downlink positioning signal, for determining a range value between the ground control station and each artificial satellite in real time, and for outputting the range value signal;

means for receiving the range value signal, for delaying a clock signal for a radio wave propagation time corresponding to the range value and for outputting a Time delayed clock signal;

means for receiving the time delayed clock signal and the downlink positioning signal, for comparing the time delayed clock signal with the downlink positioning signal and for outputting an error signal;

means for receiving the error signal, for generating the uplink positioning signal and for outputting the uplink positioning signal;

means for receiving the uplink positioning signal and for transmitting the uplink positioning signal in a desired direction;

wherein the timing of the downlink positioning signal is corrected to always coincide with the time of the ground control station, the status of the uplink positioning signal is always included in the downlink positioning signal and the status is available to an observer, in real time, within a positioning area.

8. The positioning system of claim 7, further comprising:

means for receiving downlink positioning signals transmitted from the at least four artificial satellites, for processing the received signals into at least four independent signals, for selecting one of the independent signals, and for controlling a phase of the selected signal so as to direct a transmission beam of the uplink positioning signal in a destination direction.

9. The positioning system of claim 8, wherein the processing means is a beam forming antenna network.

10. The positioning system of claim 8, wherein the means for receiving the downlink signals is an antenna structure, comprising:

a plurality of antenna elements, each having an input/output connector, the antenna elements being arranged in an array;

a plurality of low noise amplifiers, each having an input coupled to the connector of an antenna element, and each having an output, and the beam forming network having a plurality of inputs, each input coupled to an output of the low noise amplifiers.

11. The positioning system of claim 8, wherein the means for controlling the phase of the selected signal and for transmitting the uplink positioning signal comprises:
a phase shifter having a plurality of inputs and a plurality of outputs;
a plurality of high power amplifiers having a plurality of inputs coupled to the plurality of outputs of the phase shifter and a plurality of outputs coupled to the connectors of the plurality of antenna elements.

12. A positioning method, comprising the steps of:
placing at least four artificial satellites in quasi-geosynchronous altitude orbits, each orbit having a stationary altitude and an orbital inclination angle in a range from at least 5° to at least 18° with respect to an equatorial plane so that mean anomalies of the adjacent artificial satellites are at a difference of 120° and at substantially equal longitudinal intervals on the equitorial plane within a visible area as seen from a ground control station; and
forming a positioning available area as seen from an observer, the positioning available area always including at least four artificial satellites within the visible area.

13. A method for correcting a time difference of a downlink positioning signal transmitted by at least four artificial satellites in a visible area as observed from a ground control station, each satellite including communication channels for communicating between the artificial satellites, the method comprising the steps of:
measuring a range between the ground control station and each of the artificial satellites;
transmitting downlink positioning signals, by each artificial satellite, to a predetermined positioning available area and simultaneously transmitting the downlink positioning signals, by a specific artificial satellite, through the communication channels between the artificial satellites, to the ground control station;
delaying a time signal of the ground control station by a propagation time corresponding to the measured range between the ground control station and the respective artificial satellite;
comparing a phase difference between the downlink positioning signal transmitted by the respective artificial satellite and the delayed time signal and determining an error value based on the phase difference between the two signals;
transmitting a time correction command signal to the respective artificial satellite to correct a time of the downlink positioning signal.

14. A positioning method, comprising the steps of:
placing at least four artificial satellites in quasi-geosynchronous altitude orbits, each orbit having a stationary altitude and an orbital inclination angle of 20°±20° with respect to an equatorial plane so that mean anomalies of the adjacent artificial satellites are at a phase difference of 120° and ascending node positions are set at a substantially equal interval on the equatorial plane within a visible area, as seen from a ground control station, and wherein biased values are added either to the mean anomalies or the ascending node positions, and
forming a positioning available area to always include at least four artificial satellites within the visible area, as seen from an observer at a predetermined region, thereby reducing a degradation of a positional fix accuracy determined by a geometrical arrangement of the artificial satellites.

15. A positioning system including:
a plurality of artificial satellites, at least four artificial satellites always existing in a visible area, as seen from a ground control station, and wherein the satellites are placed in quasi-geosynchronous altitude orbits and one of the artificial satellites is a specific artificial satellite;
the artificial satellites including:
communication channels for communicating between the artificial satellites;
means for receiving an uplink positioning signal transmitted from the ground control station, for receiving positioning signals transmitted over the communication channels, and for simultaneously transmitting downlink positioning signals to the ground control station;
means for generating and outputting a positioning timing signal;
means for receiving a time correction command signal and the positioning timing signal, correcting a timing of the positioning timing signal and for outputting the corrected timing signal;
means for receiving the uplink positioning signal, for decoding a status of the uplink positioning signal, and for converting the status into a telemetry data signal;
means for receiving the telemetry data signal and the positioning timing signal, for multiplexing the positioning timing signal and the telemetry data signal, and for outputting the downlink positioning signal;
means for transmitting the downlink positioning signal in a desired beam pattern and direction;
the specific artificial satellite including means for receiving the uplink positioning signal transmitted by the ground control station, for transmitting the uplink positioning signal to the artificial satellite over the communication channels, for receiving the downlink positioning signal transmitted by the artificial satellite over the communication channel, and for transmitting, to the ground control station, the downlink positioning signal; and
the ground control station, including:
means for receiving the downlink positioning signals, for determining a range value between the ground control station and each artificial satellite, in real time, and for outputting the range values;
means for receiving the range values, for delaying a clock signal based upon a radio wave propagation time corresponding to the range values, and for outputting a time delayed clock signal;
means for receiving the time delayed clock signal, for comparing the time delayed clock signal with the downlink positioning timing signal, and for outputting an error signal;
means for receiving the error signal, for generating a time correction command signal from the error signal, and for outputting the time correction command signal;
means for always monitoring the downlink positioning signal and for outputting a monitored result;
means for receiving the monitored result and the time correction command signal, for generating the uplink positioning signal, and for transmitting the uplink positioning signal in a desired direction;

wherein the timing of the downlink positioning signals is corrected to always coincide with the time of the ground control station, the status of the uplink positioning signal is always included in the downlink positioning signal, and is available to an observer within a positioning available area.

16. The positioning system of claimed 15, wherein the specific artificial satellite further comprises means for communicating with a moving body, the moving body having a communication terminal device therein.

17. The positioning system of claim 16, wherein the ground control station further comprises an interface device for coupling the ground control station to an external communication channel.

* * * * *